United States Patent
Yang

(10) Patent No.: US 8,757,504 B2
(45) Date of Patent: *Jun. 24, 2014

(54) TEMPERATURE UNIFYING AND HEAT STORING SYSTEM OF SEMICONDUCTOR HEAT LOSS THROUGH NATURAL TEMPERATURE MAINTAINING MEMBER

(76) Inventor: Tai-Her Yang, Dzan-Hwa (TW)

(*) Notice: Subject to any disclaimer, the term of this patent is extended or adjusted under 35 U.S.C. 154(b) by 830 days.

This patent is subject to a terminal disclaimer.

(21) Appl. No.: 12/909,940

(22) Filed: Oct. 22, 2010

(65) Prior Publication Data

US 2012/0097361 A1 Apr. 26, 2012

(51) Int. Cl.
*G05D 23/00* (2006.01)
*F24J 3/08* (2006.01)

(52) U.S. Cl.
USPC ............... 236/1 C; 62/259.2; 62/260; 165/45

(58) Field of Classification Search
USPC ............. 236/1 C; 62/235.1, 259.2, 260, 264; 165/45, 97, 104.19, 104.31, 208, 240, 165/244, 247

See application file for complete search history.

(56) References Cited

U.S. PATENT DOCUMENTS

| 4,091,863 | A | * | 5/1978 | Schroder | 165/104.17 |
|---|---|---|---|---|---|
| 4,205,718 | A | * | 6/1980 | Balch | 165/45 |
| 5,941,238 | A | * | 8/1999 | Tracy | 126/641 |
| 8,448,876 | B2 | * | 5/2013 | Yang | 236/1 C |
| 2007/0271940 | A1 | * | 11/2007 | Yang | 62/260 |
| 2013/0068418 | A1 | * | 3/2013 | Gotland et al. | 165/45 |

* cited by examiner

*Primary Examiner* — Marc Norman
(74) *Attorney, Agent, or Firm* — Bacon & Thomas, PLLC

(57) ABSTRACT

The primary purpose of the present invention is to provide a heat equalizer and the fluid transmission duct disposed in a heat carrier existing in solid state in the nature where presents comparatively larger and more stable heat carrying capacity for passing through the fluid. The fluid passes through the solid or gas state semiconductor application installation to regulate temperature equalization of the semiconductor application installation and flows back to the heat equalization installation disposed in the natural heat carrier for the heat equalization installation providing good heat conduction in the natural heat carrier to provide the operation of temperature equalization regulating function on the backflow of the fluid, and through the heat equalizer to transfer thermal energy to the heat storing block constituted by the surrounding natural heat carrier so as to store heat for releasing thermal energy to the specified heat releasing target.

23 Claims, 14 Drawing Sheets

TEMPERATURE UNIFYING AND HEAT STORING SYSTEM OF SEMICONDUCTOR HEAT LOSS THROUGH NATURAL TEMPERATURE MAINTAINING MEMBER

BACKGROUND OF THE INVENTION (a) Field of the Invention

The present invention is related to a temperature unifying and heat storing system of semiconductor heat loss through the natural temperature maintaining member, and more particularly, to one comprised of heat equalizer and fluid transmission duct disposed in a natural heat carrier in solid state including stratum, surface of earth, desert that having larger and stable heat carrying capacity for the heat equalization installation to directly execute the operation of temperature equalization heat storage function on the fluid with temperature difference flowing through the solid or gas state semiconductor application installation, and through the heat equalizer (102) to transfer thermal energy to a heat storing block (1500) constituted by the surrounding natural heat carrier so as to store heat for releasing thermal energy to a specified heat releasing target (2000); or alternatively, for an additionally installed relay heat equalizer giving good thermal conduction with the heat equalization installation to provide the operation of temperature equalization regulating function on the fluid with temperature difference flowing through the relay heat equalizer, and through the heat equalizer (102) to transfer thermal energy to the heat storing block (1500) constituted by the surrounding natural heat carrier so as to store heat for releasing thermal energy to the specified heat releasing target (2000).

(b) Description of the Prior Art

An active temperature regulation device must be provided in conventional solid or gas state semiconductor application installation for maintaining the temperature, cooling or heating, which enhances cost and consumes more energy, moreover, the semiconductor heat loss is rarely directly recycled as waste heat in the form of the thermal energy.

SUMMARY OF THE INVENTION

The primary purpose of the present invention is to provide an fluid circulating installation adapted with a temperature equalization installation and fluid transmission duct disposed in a natural heat carrier in solid state that having larger and stable heat carrying capacity. The fluid passes through the solid or gas state semiconductor application installation to perform temperature equalization regulation of the solid or gas state semiconductor application installation, and flows back to the heat equalization installation disposed in the natural heat carrier for the heat equalization installation providing good heat conduction with the natural heat carrier to provide the operation of temperature equalization regulating function on the backflow of the fluid, and through the heat equalizer (102) to transfer thermal energy to a heat storing block (1500) constituted by the surrounding natural heat carrier so as to store heat for releasing thermal energy to a specified heat releasing target (2000).

DESCRIPTION OF MAIN COMPONENT SYMBOLS

Figure 1:
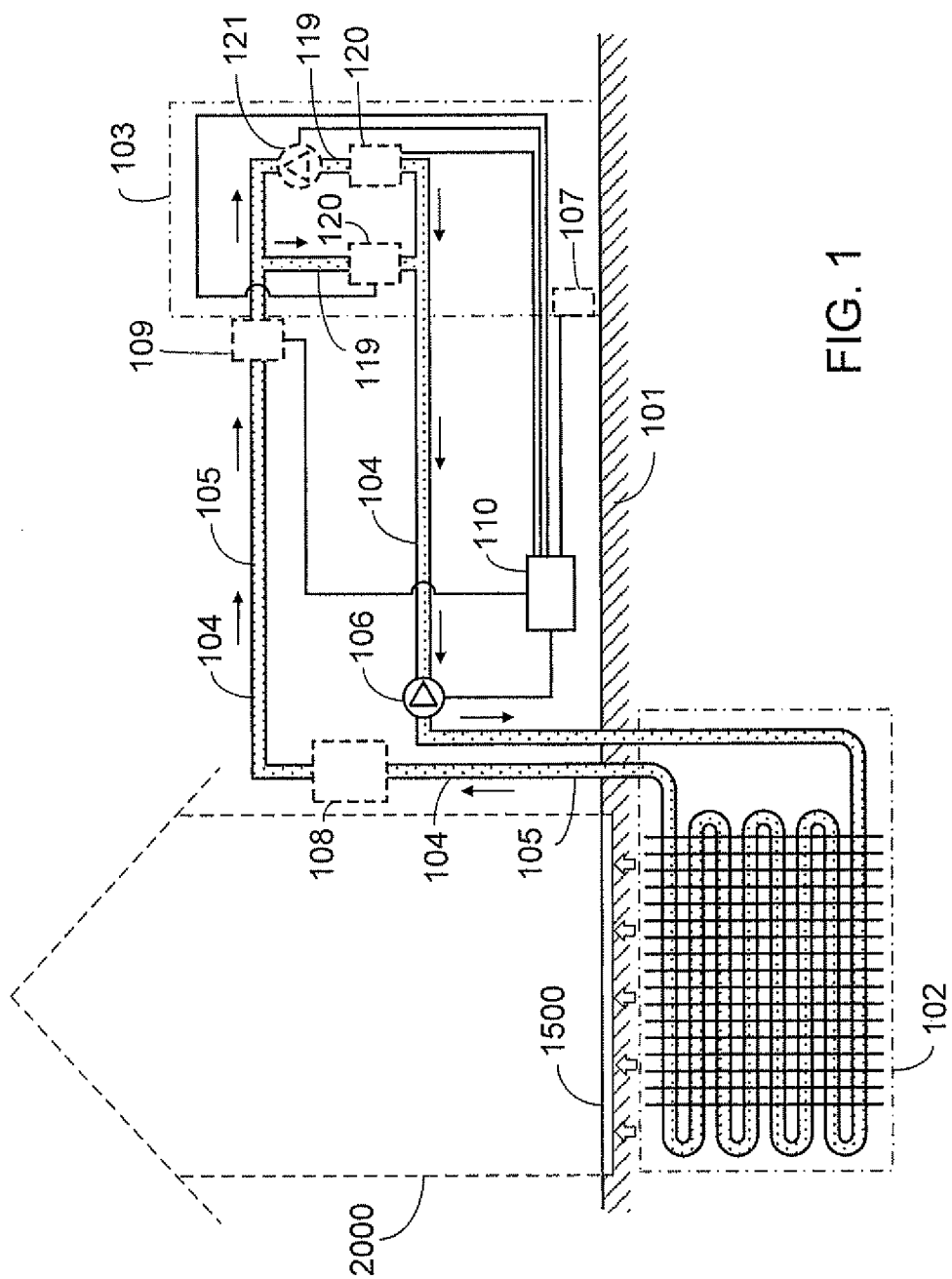
FIG. 1 is a schematic view showing a system of the present invention to directly provide temperature equalization and heat storage by means of a one-way fluid.

101: natural heat carrier
102: heat equalizer
103: semiconductor application installation
1031: semiconductor application installation constituted by the LED or gas state lamp with heat dissipation structure at the back
1032: semiconductor application installation constituted by the photovoltaic generation device with heat dissipation structure at the back 104, 204: fluid
105, 205: fluid transmission duct
106: pump
107: temperature detector device
108: filter
109: auxiliary temperature regulation device
110: control unit
119: liquid bypass duct
120: bypass control valve
121: bypass auxiliary pump
202: relay heat equalizer
206: fluid relay pump
300: Light Emitting Diode (LED) or gas state lamp
310: driving control circuit
400: Optical structure and housing structure of lamp
600: support
601: thermal conduction wing
620: Outer duct
700: heat insulation material
800: heat conductor
900: electricity storage device
1000: photovoltaic generation device
1005: electricity regulating device
1100: auxiliary supporting arm
1200: light source tracking mechanism device
1500: natural temperature maintaining member block
2000: specified heat releasing target

DETAILED DESCRIPTION OF THE PREFERRED EMBODIMENTS

The present invention is related to a temperature unifying and heat storing system of semiconductor heat loss through natural temperature maintaining member, which is by means of the solid state natural heat carrier, such as the stratum, surface of earth in the nature that provides comparatively reliable thermal energy being disposed with a heat equalizer with good thermal conduction performance to regulate the fluid with temperature difference flowing through the solid or gas state semiconductor application installation for temperature equalization; and by means of the heat equalizer (102) to transfer thermal energy to a heat storing block (1500) constituted by the surrounding natural heat carrier so as to store heat for releasing thermal energy to a specified heat releasing target (2000).

Based on the environment, benefits and cost considerations, the temperature unifying and heat storing system of semiconductor heat loss through natural temperature maintaining member of the present invention is comprised of the following system configurations:

1) A system directly provides temperature equalization function by means of a one-way fluid;

2) A system indirectly provides temperature equalization function by means of a one-way fluid;

3) A system directly provides temperature equalization function by means of a two-way fluid; and 4) A system indirectly provides temperature equalization function by means of a two-way fluid.

As illustrated in FIG. 1 for a schematic view showing a system of the present invention to directly provide temperature equalization and heat storage by means of a one-way fluid; the system is disposed with at least one fluid transmission duct (105). A pump (106) is disposed to pump the fluid to pass through a semiconductor application installation (103), the fluid transmission duct (105) and flow back to a heat equalizer (102) disposed in a natural heat carrier (101) wherein the heat carrier comes from stratum, surface of earth, desert in a solid state that provides larger and comparatively reliable thermal energy to complete a path of the fluid. The system is essentially comprised of:

the heat equalizer (102): relates to one made of a material with good heat conduction performance and constructed in a way to provide good heat conduction with the natural heat carrier (101); the heat equalizer (102) is provided with a fluid inlet, a fluid outlet, and an internal fluid passage; or the space inside the natural heat carrier (101) allowing the fluid to flow forthwith directly constitutes the heat storage function of the heat equalizer (102), thereby replacing the heat equalizer (102), made of a material with good heat conduction performance; or both of the heat equalizer (102) and the space inside the natural heat carrier (101) are provided at the same time; comprising one or more than one heat equalizers (102) performing temperature equalization to the same temperature unifying and heat storing system of semiconductor heat loss through natural temperature maintaining member; or one heat equalizer (102) performing temperature equalization to one or more than one independently disposed temperature unifying and heat storing system of semiconductor heat loss through natural temperature maintaining member; or two or more than two heat equalizers (102) performing temperature equalization to two or more than two independently disposed temperature unifying and heat storing system of semiconductor heat loss through natural temperature maintaining member; and through the heat equalizer (102) to transfer thermal energy to the heat storing block (1500) constituted by the surrounding natural heat carrier so as to store heat for releasing thermal energy to the specified heat releasing target (2000);

specified heat releasing target (2000): it relates to the surface of earth of the heat storing block (1500) constituted by the natural heat carrier adjacent to the surrounding of the heat equalizer (102), such as the ground, a road surface or a floor of a building, or a wall recessed into the ground;

a semiconductor application installation (103): it relates to a semiconductor application installation including semiconductor consists of solid or gas state, or semiconductor combined with a heat dissipating device, or packaged semiconductor, or packaged semiconductor combined with a heat dissipating device; the heat dissipation device combined with the semiconductor including liquid state, or gas state, or solid state, or heat dissipation device with thermal duct, and the semiconductor application installation is constituted by one or more than one type of semiconductors as follows, including: all kinds of LED, electric to light energy lighting device of the gas state semiconductor, photovoltaic generation device, power transistor, rectifying diode, thyristor, MOSFET, IGBT, GTO, SCR, TRIAC, linear transistor, and all kinds of integrated circuits, RAMs, CPU, server containing the semiconductor, or the application installations such as LED lighting device, photovoltaic generation device using photovoltaic energy containing the semiconductor, or CPU, large host computer, server, power supply device, electromechanically driven control device, converter, inverter, charger, electrical heat controlling device, electromagnetic controller, and electric lighting drive controlling device constituted by semiconductor components; the semiconductor application installations mentioned above are also provided with temperature equalization structure, or above mentioned various semiconductor installation (103) make use of the heat dissipater equipped with a cooling or heating device to serve as the temperature equalization structure;

The inside of the semiconductor application installation (103) is provided with a duct for the fluid (104) to pass through, and is provided with a construction for temperature equalization regulation with the fluid (104) at the location of the desired temperature equalization target structure of the semiconductor application installation (103); or the duct for circulating the fluid (104) is directly passing the location of the desired temperature equalization target, thereby directly performing the operation of temperature equalization regulation function; furthermore, optional items including a fluid bypass duct (119), a bypass control valve (120), and a bypass auxiliary pump (121) are provided as applicable to introduce the fluid (104) from the heat equalizer (102) disposed in the natural heat carrier (101) to regulate for temperature equalization by having the fluid (104) to flow through the selected individual part of the semiconductor application installation (103), and then the fluid (104) flows back to the heat equalizer (102) to complete the circulation for the operation to provide temperature equalization;

the fluid (104): it relates to a gas or a liquid provided to execute the function of heat transmission; the fluid (104) is pumped by the pump (106) to flow through the heat equalizer (102) disposed in the natural heat carrier (101), the fluid transmission duct (105), the optionally installed bypass duct (119) disposed in the semiconductor application installation (103), and flows back through the fluid transmission duct (105) to the heat equalizer (102) to complete the circulation for the operation to provide temperature equalization;

the fluid transmission duct (105): it relates to a duct structure provided at where between the heat equalizer (102) and the semiconductor application installation (103) and connected in series with the pump (106) for the fluid (104) to circulate; to facilitate maintenance, an optional structure to open or to draw is provided to the fluid transmission duct (105) as applicable;

the said fluid transmission duct (105) is further made of material having better heat insulation, or material having at least a layer of heat insulation, or material spread with a layer with heat insulation property so that when the internal fluid flows through the transmission duct (105), it is less likely to be affected by the surrounding temperature;

the pump (106): it relates to a fluid pump driven by electric power, mechanical force, manpower, or any other natural force as the power source, being connected in series with the fluid transmission duct (105), and subject to the control by a control unit (110) to pump the fluid (104); this pumping function can be replaced by the convection effects caused by the rising hot fluid and sinking cold fluid;

a temperature detector device (107): it is related to analog or digital dynamo-electric or solid state electronic devices of the prior art, and is disposed in semiconductor application installation (103) to indicate the temperature, or to provide signal feedback to the control unit (110), and through controlling the pump (106) to operate or stop enabling the system to operate in programmed temperature range, and an auxiliary temperature regulating device (109) is disposed in the system and is activated when the pump (106) operates to reach the programmed time but the temperature yet still unable to operate in the programmed range; this device is optionally installed or not installed as applicable;

a filter (108): it is provided at the fluid suction inlet or outlet of each device mounted to the fluid circulation loop, or at a selected location in the fluid transmission duct (105) to filter fluid foreign material, prevent the duct from getting plugged and assure of clean fluid; the filter (108) is optionally installed or not installed as applicable;

an auxiliary temperature regulation device (109): it is related to dynamo-electric solid, gas or liquid state temperature regulation device to heat or cool the fluid (104), or a electric heating or cooling device comprised of solid state or semiconductor, as subject to the control by the control unit (110) to activate the auxiliary temperature regulating device (109) when the system temperature drifting programmed range, thereby to regulate the temperature by heating or cooling to the heating or cooling location of the fluid (104); this device is optionally installed or not installed as applicable; and the control unit (110): it is comprised of dynamo-electric or solid state electronic circuit and related software, and is served to control the fluid pump (106) to pump the fluid (104) in one-way continuous operation or intermittent operation according to the temperature detection signal and system temperature setting of the temperature detection device (107), and to control the direction and flow rate of the fluid (104) between the heat equalizer (102) and the semiconductor application installation (103); and by means of controlling the operation or stop of the pump (106) for the system to operate in the programmed temperature range, and to activate and operatively control the auxiliary temperature regulating device (109) disposed in the system for performing auxiliary temperature regulation when the pump (106) operates to reach the programmed time but the temperature yet still unable to operate in the programmed range; as well as to control system to reduce the load or cut off the power supply when the system temperature is abnormal;

if the fluid bypass duct (119), the bypass control valve (120), and the bypass auxiliary pump (121) are optionally installed to the semiconductor application installation (103), the control unit (110) controls the operation of the bypass control valve (120) and the bypass auxiliary pump (121) to pump or stop pumping the fluid (104) in each fluid bypass duct (119), and controls the flow rate or any other related functions;

the functions of the control unit (110) can be set according to the requirements, and the control unit (110) is optionally installed or not installed as applicable.

Figure 2:
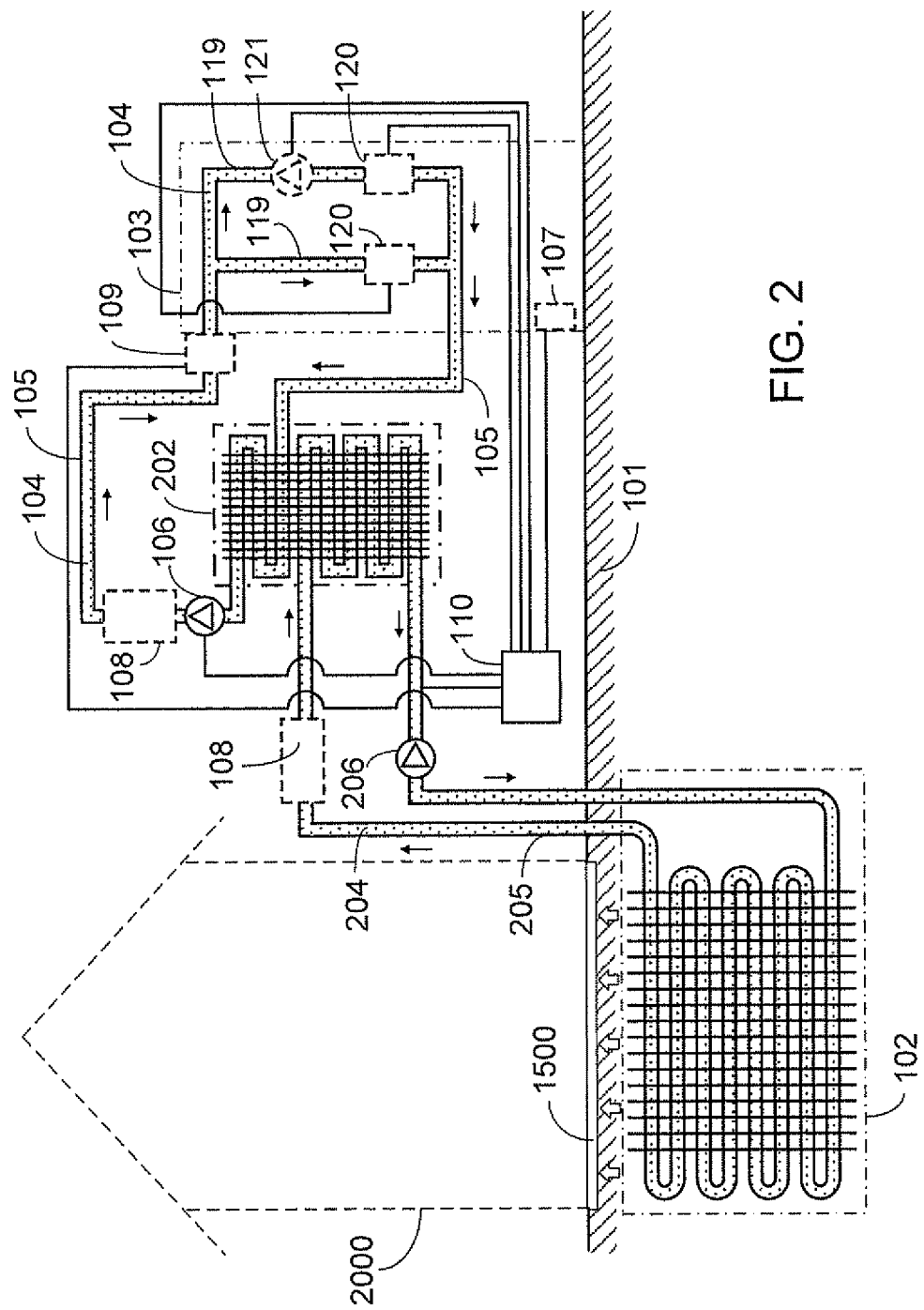
FIG. 2 is a schematic view showing a system of the present invention to indirectly provide temperature equalization and heat storage by means of a one-way fluid.

FIG. 2 is a schematic view showing a system of the present invention to indirectly provide temperature equalization and heat storage by means of a one-way fluid. Wherein, an additionally installed relay heat equalizer (202) is provided to indirectly transmit thermal energy for constituting a regulation system of one-way indirect temperature equalization. The system illustrated in FIG. 2 is essentially comprised of:

the heat equalizer (102): it relates to one made of a material with good heat conduction performance and is disposed in the natural heat carrier (101) having the structure with good heat conduction with the natural heat carrier (101); the semiconductor application installation (103) is by means of the operation of the fluid (104), the fluid transmission duct (105), the pump (106), the temperature detection device (107), the filter (108), the control unit (110), and those optional items including auxiliary temperature regulation device (109), the bypass duct (119), the bypass control valve (120), and the bypass auxiliary pump (121) for providing equalizing thermal conduction function with the heat equalizer (102), and through the heat equalizer (102) to transfer thermal energy to the heat storing block (1500) constituted by the surrounding natural heat carrier so as to store heat for releasing thermal energy to the specified heat releasing target (2000);

specified heat releasing target (2000): it relates to the surface of earth of the heat storing block (1500) constituted by the natural heat carrier adjacent to the surrounding of the heat equalizer (102), such as the ground, a road surface or a floor of a building, or a wall recessed into the ground;

the relay heat equalizer (202) is made of one or more than one kind of material giving good heat accumulation and heat conduction properties, and is provided with a first fluid passage including inlet, flowing passage, and outlet for the fluid (104) and a second fluid passage including inlet, flowing passage, and outlet for another fluid (204); both of the fluid (104) and the fluid (204) transmit thermal energy to each other by means of the relay heat equalizer (202);

a fluid transmission duct (205) and a fluid relay pump (206) are provided at where between the heat equalizer (102) and the relay heat equalizer (202) to continuously or intermittently execute one-way pumping the fluid (204) between the heat equalizer (102) and the relay heat equalizer (202) to form a closed loop flow passage for functioning the regulation of temperature equalization between the heat equalizer (102) and the relay heat equalizer (202);

the fluid transmission duct (105) and the pump (106) are disposed between the semiconductor application installation (103) and the relay heat equalizer (202) to continuously or intermittently execute one-way pumping the fluid (104) between the semiconductor application installation (103) and the relay heat equalizer (202) to provide the function of the temperature equalization regulation;

the fluid transmission duct (105): relates to a duct structure for the fluid (104) to pass through, and to facilitate maintenance, an optional device with structure to open or to draw is provided to the fluid transmission duct (105) as applicable;

the said fluid transmission duct (105) is further made of material having better heat insulation, or material having at least a layer of heat insulation, or material spread with a layer with heat insulation property so that when the internal fluid flows through the transmission duct (105), it is less likely to be affected by the surrounding temperature;

the fluid (104): it relates to a gas or liquid giving good heat accumulation and heat conduction properties, and is pumped by the pump (106) for the fluid (104) between the relay heat equalizer (202) and the semiconductor application installation (103) to constitute a flow passage through the fluid transmission duct (105) to provide the regulating function of heat equalization; and the fluid (104) is or is not identical with the fluid (204) as applicable;

the fluid transmission duct (205): it relates to a duct structure for the fluid (204) to pass through, and to facilitate maintenance, an optional device with structure to open or to draw is provided to the fluid transmission duct (205) as applicable;

the said fluid transmission duct (205) is further made of material having better heat insulation, or material having at least a layer of heat insulation, or material spread with a layer with heat insulation property so that when the internal fluid flows through the transmission duct (205), it is less likely to be affected by the surrounding temperature;

the fluid (204): it relates to a gas or liquid giving good heat accumulation and heat conduction properties, and is pumped by the relay pump (206) for the fluid (204) between the heat equalizer (102) and the relay heat equalizer (202) to constitute a flow passage through the fluid transmission duct (205) to provide the regulating function of heat equalization; and the fluid (204) is or is not identical with the fluid (104) as applicable;

the pump (106): relates to a fluid pump driven by electric power or mechanical force to pump the fluid (104); and this pumping function can be replaced by the convection effects caused by the rising hot fluid and sinking cold fluid;

the relay pump (206): relates to a fluid pump driven by electric power or mechanical force to pump the fluid (204); and this pumping function can be replaced by the convection effects caused by the rising hot fluid and sinking cold fluid;

the fluid transmission duct (105) and the pump (106) are disposed at where between the semiconductor application installation (103) and the relay heat equalizer (202), and by means of the pump (106) to pump the fluid (104) flowing between the semiconductor application installation (103) and the relay heat equalizer (202) to provide the function of temperature equalization;

the control unit (110): it is comprised of dynamo-electric or solid state electronic circuit and related software, and is served to control the fluid pump (106) to pump the fluid (104) in one-way continuous operation or intermittent operation according to the temperature detection signal and system temperature setting of the temperature detection device (107), and to control the flowing direction and flow rate of the fluid (104) between the semiconductor application installation (103) and the relay heat equalizer (202) and the flowing direction and flow rate of the fluid (204) between the relay heat equalizer (202) and the heat equalizer (102), and to control the pump (106) to pump the fluid (104) or to control the relay pump (206) to pump the fluid (204) for one-way continuous or intermittent pumping operation; and by means of controlling the operation or stop of the pump (106) for the system to operate in the programmed temperature range, and to activate and operatively control the auxiliary temperature regulating device (109) disposed in the system for performing auxiliary temperature regulation when the pump (106) operates to reach the programmed time but the temperature yet still unable to operate in the programmed range; as well as to control system to reduce the load or cut off the power supply when the system temperature is abnormal; and the control operation of the control unit (110) includes:

the pump (106) subject to the control by the control unit (110) executes one-way continuous or intermittent pumping operation to pump the fluid (104) between the semiconductor application installation (103) and the relay heat equalizer (202) for constituting one-way control and regulation of temperature equalization; and the relay pump (206) subject to the control by the control unit (110) executes one-way continuous or intermittent pumping operation to pump the fluid (204) between the heat equalizer (102) and the relay heat equalizer (202) for constituting one-way control and regulation of temperature equalization;

if the bypass duct (119), the bypass control valve (120), and the bypass auxiliary pump (121) are optionally installed to the semiconductor application installation (103), the control unit (110) controls the operation of the bypass control valve (120) and the bypass auxiliary pump (121) to pump or stop pumping the fluid (104) in each bypass duct (119), and controls the flow rate or any other related functions;

The functions of the control unit (110) can be set according to the requirements, and the control unit (110) is optionally installed or not installed as applicable.

Figure 3:
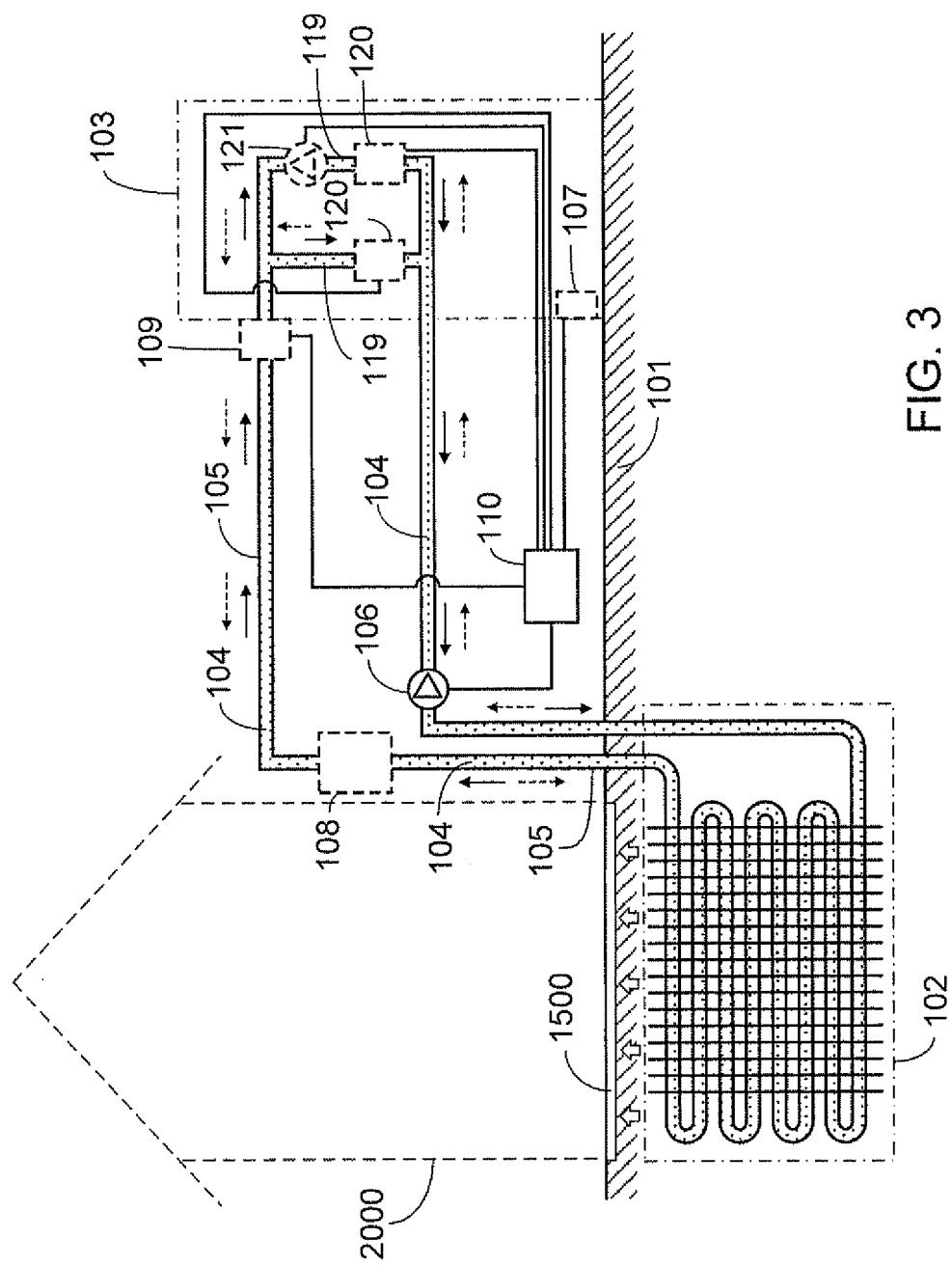
FIG. 3 is a schematic view showing a system of the present invention to directly provide temperature equalization and heat storage by means of a two-way fluid.

FIG. 3 is a schematic view showing a system of the present invention to directly provide temperature equalization and heat storage by means of a two-way fluid, thereby being disposed with the heat equalizer (102) having good heat conduction in the natural heat carrier (101) consists of solid state natural heat carrier including stratum, surface of earth or desert where presents comparatively larger and more reliable heat carrying capacity. The system illustrated in FIG. 3 is essentially comprised of:

the heat equalizer (102): it relates to one made of a material with good heat conduction performance and constructed in a way to provide good heat conduction with the natural heat carrier (101); the heat equalizer (102) is provided with a fluid inlet, a fluid outlet, and an internal fluid passage; or the space inside the natural heat carrier (101) allowing the fluid to flow forthwith directly constitutes the heat storage function of the heat equalizer (102), thereby replacing the heat equalizer (102), made of a material with good heat conduction performance; or both of the heat equalizer (102) and the space inside the natural heat carrier (101) are provided at the same time; comprising one or more than one heat equalizers (102) performing temperature equalization to the same temperature unifying and heat storing system of semiconductor heat loss through natural temperature maintaining member; or one heat equalizer (102) performing temperature equalization to one or more than one independently disposed temperature unifying and heat storing system of semiconductor heat loss through natural temperature maintaining member; or two or more than two heat equalizers (102) performing temperature equalization to two or more than two independently disposed temperature unifying and heat storing system of semiconductor heat loss through natural temperature maintaining member, and through the heat equalizer (102) to transfer thermal energy to the heat storing block (1500) constituted by the surrounding natural heat carrier so as to store heat for releasing thermal energy to the specified heat releasing target (2000);

specified heat releasing target (2000): it relates to the surface of earth of the heat storing block (1500) constituted by the natural heat carrier adjacent to the surrounding of the heat equalizer (102), such as the ground, a road surface or a floor of a building, or a wall recessed into the ground;

a semiconductor application installation (103): it relates to a semiconductor application installation including semiconductor consists of solid or gas state, or semiconductor combined with a heat dissipating device, or packaged semiconductor, or packaged semiconductor combined with a heat dissipating device; the heat dissipation device combined with the semiconductor including liquid state, or gas state, or solid state, or heat dissipation device with thermal duct, and the semiconductor application installation is constituted by one or more than one type of semiconductors as follows, including: all kinds of LED, electric to light energy lighting device of the gas state semiconductor, photovoltaic generation device, power transistor, rectifying diode, thyristor, MOSFET, IGBT, GTO, SCR, TRIAC, linear transistor, and all kinds of integrated circuits, RAMs, CPU, server containing the semiconductor, or the application installations such as LED lighting device, photovoltaic generation device using photovoltaic energy containing the semiconductor, or CPU, large host computer, server, power supply device, electromechanically driven control device, converter, inverter, charger, electrical heat controlling device, electromagnetic controller, and electric lighting drive controlling device constituted by semiconductor components; the semiconductor application installations mentioned above are also provided with temperature equalization structure, or above mentioned various semiconductor installation (103) make use of the heat dissipater equipped with a cooling or heating device to serve as the temperature equalization structure;

The inside of the semiconductor application installation (103) is provided with a duct for the fluid (104) to pass through, and is provided with a construction for temperature equalization regulation with the fluid (104) at the location of the desired temperature equalization target structure of the semiconductor application installation (103); or the duct for circulating the fluid (104) is directly passing the location of the desired temperature equalization target, thereby directly performing the operation of temperature equalization regulation function; furthermore, optional items including a fluid bypass duct (119), a bypass control valve (120), and a bypass auxiliary pump (121) are provided as applicable to introduce the fluid (104) from the heat equalizer (102) disposed in the natural heat carrier (101) to regulate for temperature equalization by having the fluid (104) to flow through the selected individual part of the semiconductor application installation (103), and then the fluid (104) flows back to the heat equalizer (102) to complete the circulation for the operation to provide temperature equalization;

the fluid (104): it relates to a gas or a liquid provided to execute the function of heat transmission; the fluid (104) is pumped by the pump (106) to flow through the heat equalizer (102) disposed in the natural heat carrier (101), the fluid transmission duct (105), the optionally installed bypass duct (119) disposed in the semiconductor application installation (103), and flows back through the fluid transmission duct (105) to the heat equalizer (102) to complete the circulation for the operation to provide temperature equalization;

the fluid transmission duct (105): it relates a duct structure provided at where between the heat equalizer (102) and the semiconductor application installation (103) and connected in series with the pump (106) for the fluid (104) to circulate; to facilitate maintenance, an optional structure to open or to draw is provided to the fluid transmission duct (105) as applicable;

the said fluid transmission duct (105) is further made of material having better heat insulation, or material having at least a layer of heat insulation, or material spread with a layer with heat insulation property so that when the internal fluid flows through the transmission duct (105), it is less likely to be affected by the surrounding temperature;

the pump (106): it relates to a fluid pump driven by electric power, mechanical force, manpower, or any other natural force as the power source, for connecting in series with the fluid transmission duct (105), and subject to the control by a control unit (110) to pump the fluid (104); this pumping function can be replaced by the convection effects caused by the rising hot fluid and sinking cold fluid;

a temperature detector device (107): it is related to analog or digital dynamo-electric or solid state electronic devices of the prior art, and is disposed in semiconductor application installation (103) to indicate the temperature, or to provide signal feedback to the control unit (110), and through controlling the pump (106) to operate or stop enabling the system to operate in programmed temperature range, and an auxiliary temperature regulating device (109) is disposed in the system and is activated when the pump (106) operates to reach the programmed time but the temperature yet still unable to operate in the programmed range; this device is optionally installed or not installed as applicable;

a filter (108): it is provided at the fluid suction inlet or outlet of each device mounted to the fluid circulation loop, or at a selected location in the fluid transmission duct (105) to filter fluid foreign material, prevent the duct from getting plugged and assure of clean fluid; the filter (108) is optionally installed or not installed as applicable;

an auxiliary temperature regulation device (109): it is related to dynamo-electric solid, gas or liquid state temperature regulation device to heat or cool the fluid (104), or a electric heating or cooling device comprised of solid state or semiconductor, as subject to the control by the control unit (110) to activate the auxiliary temperature regulating device (109) when the system temperature drifting programmed range, thereby to regulate the temperature by heating or cooling to the heating or cooling location of the fluid (104); this device is optionally installed or not installed as applicable; and the control unit (110): it is comprised of dynamo-electric or solid state electronic circuit and related software, and is served to control the fluid pump (106) to pump the fluid (104)

in continuous operation or intermittent operation according to the temperature detection signal and system temperature setting of the temperature detection device (107), and to control the direction and flow rate of the fluid (104) between the heat equalizer (102) and the semiconductor application installation (103); and by means of controlling the operation or stop of the pump (106) for the system to operate in the programmed temperature range, and to activate and operatively control the auxiliary temperature regulating device (109) disposed in the system for performing auxiliary temperature regulation when the pump (106) operates to reach the programmed time but the temperature yet still unable to operate in the programmed range; as well as to control system to reduce the load or cut off the power supply when the system temperature is abnormal; and to periodically exchange the flowing direction of the pumped fluid (104) in positive or negative or positive-negative direction, the operation whereof includes continuous pumping operation and intermittent pumping operation; the control operation of the control unit (110) includes:

the pump (106) subject to the control by the control unit (110) periodically pumps the fluid (104) in both positive and negative directions for the fluid (104) flowing through the heat equalizer (102), the fluid transmission duct (105) and the interior of the semiconductor application installation (103) to execute periodical exchange of the flowing direction; and for the fluid (104) passing through the heat equalizer (102) and the inlet and outlet of the semiconductor application installation (103) to provide better results of temperature equalization due to periodical exchange of the flowing direction, thus to constitute two-way regulation and control of temperature equalization;

if the fluid bypass duct (119), the bypass control valve (120), and the bypass auxiliary pump (121) are optionally installed to the semiconductor application installation (103), the control unit (110) controls the operation of the bypass control valve (120) and the bypass auxiliary pump (121) to pump or stop pumping the fluid (104) in each bypass duct (119), and controls the flow rate or any other related functions;

the functions of the control unit (110) can be set according to the requirements, and the control unit (110) is optionally installed or not installed as applicable.

Figure 4:
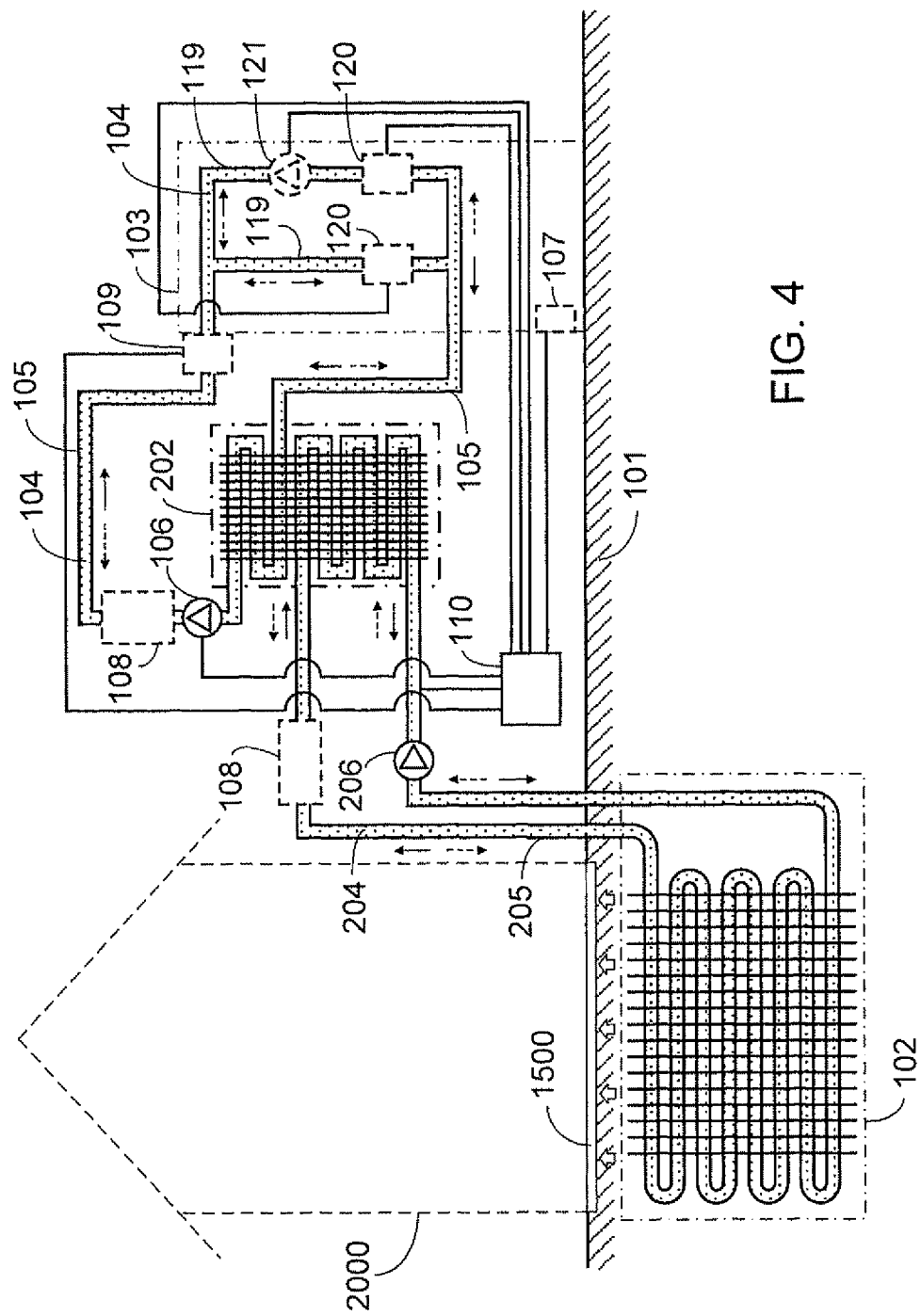
FIG. 4 is a schematic view showing a system of the present invention to indirectly provide temperature equalization and heat storage by means of a two-way fluid.

FIG. 4 is a schematic view showing a system of the present invention to indirectly provide temperature equalization and heat storage by means of a two-way fluid. Wherein, an additionally installed relay heat equalizer (202) is provided to indirectly transmit thermal energy for constituting a two-way indirect regulation system of temperature equalization. Other than those items including the heat equalizer (102) disposed in the natural heat carrier (101), the semiconductor application installation (103), the fluid (104), the fluid transmission duct (105), the pump (106), the temperature detection device (107), the filter (108), the control unit (110), and those optional items including the auxiliary temperature regulation device (109), the bypass duct (119), the bypass control valve (120), and the bypass auxiliary pump (121), for being disposed with the heat equalizer (102) having good heat conduction in the natural heat carrier (101) consists of solid state natural heat carrier including stratum, surface of earth or desert where presents comparatively larger and more reliable heat carrying capacity. This system indirectly executing regulation of temperature equalization by means of the two-way fluid further includes:

the relay heat equalizer (202) is made of one or more than one kind of material giving good heat accumulation and heat conduction properties, and is provided with a first fluid passage including inlet, flowing passage, and outlet for the fluid (104) and a second fluid passage including inlet, flowing passage, and outlet for another fluid (204); both of the fluid (104) and the fluid (204) transmit thermal energy to each other by means of the relay heat equalizer (202);

the fluid transmission duct (205) and a fluid relay pump (206) are provided at where between the heat equalizer (102) and the relay heat equalizer (202) to continuously or intermittently execute periodically positive and negative pumping the fluid (204) between the heat equalizer (102) and the relay heat equalizer (202) to form a closed loop flow passage for functioning the regulation of temperature equalization between the heat equalizer (102) and the relay heat equalizer (202), and through the heat equalizer (102) to transfer thermal energy to the heat storing block (1500) constituted by the surrounding natural heat carrier so as to store heat for releasing thermal energy to the specified heat releasing target (2000);

specified heat releasing target (2000): it relates to the surface of earth of the heat storing block (1500) constituted by the natural heat carrier adjacent to the surrounding of the heat equalizer (102), such as the ground, a road surface or a floor of a building, or a wall recessed into the ground;

the fluid transmission duct (105) and the pump (106) are disposed between the semiconductor application installation (103) and the relay heat equalizer (202) to continuously or intermittently execute periodically positive and negative pumping of the fluid (104) between the semiconductor application installation (103) and the relay heat equalizer (202) to provide the function of the temperature equalization regulation;

the fluid transmission duct (105): it relates to a duct structure provided for the fluid (104) to circulate; to facilitate maintenance, an optional device with structure to open or to draw is provided to the fluid transmission duct (105) as applicable;

the said fluid transmission duct (105) is further made of material having better heat insulation, or material having at least a layer of heat insulation, or material spread with a layer with heat insulation property so that when the internal fluid flows through the transmission duct (105), it is less likely to be affected by the surrounding temperature;

the fluid (104): it relates to a gas or liquid giving good heat accumulation and heat conduction properties, and is pumped by the pump (106) for the fluid (104) between the relay heat equalizer (202) and the semiconductor application installation (103) to constitute a flow passage through the fluid transmission duct (105) to provide the regulating function of heat equalization; and the fluid (104) is or is not identical with the fluid (204) as applicable;

the fluid transmission duct (205): it relates to a duct structure for the fluid (204) to pass through, and to facilitate maintenance, an optional device with structure to open or to draw is provided to the fluid transmission duct (205) as applicable;

the said fluid transmission duct (205) is further made of material having better heat insulation, or material having at least a layer of heat insulation, or material spread with a layer with heat insulation property so that when the internal fluid flows through the transmission duct (205), it is less likely to be affected by the surrounding temperature;

the fluid (204): it relates to a gas or liquid giving good heat accumulation and heat conduction properties, and is pumped by the relay pump (206) for the fluid (204) between the heat equalizer (102) and the relay heat equalizer (202) to constitute a flow passage through the fluid transmission duct (205)

to provide the regulating function of heat equalization; and the fluid (204) is or is not identical with the fluid (104) as applicable;

the pump (106): relates to a fluid pump driven by electric power, mechanical force, manpower, or any other natural force, connected in series with the fluid transmission duct (105), and subject to the control by a control unit (110) to pump the fluid (104); this pumping function can be replaced by the convection effects caused by the rising hot fluid and sinking cold fluid;

the relay pump (206): relates to a fluid pump driven by electric power or mechanical force to pump the fluid (204); and this pumping function can be replaced by the convection effects caused by the rising hot fluid and sinking cold fluid;

the control unit (110): it is comprised of dynamo-electric or solid state electronic circuit and related software, and is served to control the fluid pump (106) to pump the fluid (104) in continuous operation or intermittent operation according to the temperature detection signal and system temperature setting of the temperature detection device (107), and to control the flowing direction and flow rate of the fluid (104) between the semiconductor application installation (103) and the relay heat equalizer (202) and the flowing direction and flow rate of the fluid (204) between the relay heat equalizer (202) and the heat equalizer (102), and to control the pump (106) to pump the fluid (104) or to control the relay pump (206) to pump the fluid (204) for executing periodically positive, or negative, or positive-negative exchange of the flowing direction of the fluid (104) or the flowing direction of the fluid (204), wherein the operation methods include continuous pumping and intermittent pumping; and by means of controlling the operation or stop of the pump (106) for the system to operate in the programmed temperature range, and to activate and operatively control the auxiliary temperature regulating device (109) disposed in the system for performing auxiliary temperature regulation when the pump (106) operates to reach the programmed time but the temperature yet still unable to operate in the programmed range; as well as to control system to reduce the load or cut off the power supply when the system temperature is abnormal; and the control operation of the control unit (110) includes:

the pump (106) subject to the control by the control unit (110) periodically pumps the fluid (104) in both positive and negative directions for the fluid (104) flowing through the relay heat equalizer (202), the fluid transmission duct (105) and the interior of the semiconductor application installation (103) to execute periodical exchange of the flowing direction; and for the fluid (104) passing through the relay heat equalizer (202), and the inlet and outlet of the semiconductor application installation (103) to provide better results of temperature equalization due to periodical exchange of the flowing direction, thus to constitute two-way regulation and control of temperature equalization; and the relay pump (206) subject to the control by the control unit (110) periodically pumps the fluid (204) in both positive and negative directions for the fluid (204) flowing through the heat equalizer (102), the fluid transmission duct (205) and the interior of relay heat equalizer (202) to execute periodical exchange of the flowing direction; and for the fluid (204) passing through the relay heat equalizer (202) and the inlet and outlet of the heat equalizer (102) to provide better results of temperature equalization due to periodical exchange of the flowing direction, thus to constitute two-way regulation and control of temperature equalization;

if the bypass duct (119), the bypass control valve (120), and the bypass auxiliary pump (121) are optionally installed to the semiconductor application installation (103), the control unit (110) controls the operation of the bypass control valve (120) and the bypass auxiliary pump (121) to pump or stop pumping the fluid (104) in each bypass duct (119), and controls the flow rate or any other related functions;

The functions of the control unit (110) can be set according to the requirements, and the control unit (110) is optionally installed or not installed as applicable.

For the system illustrated in FIG. 1 showing the operation of heat equalization between the heat equalizer (102) and the semiconductor application installation (103), at least one of the fluid transmission duct (105) and at least one of the pump (106) are disposed at where between the heat equalizer (102) and the semiconductor application installation (103) to constitute a closed loop of flow passage; and having the pump (106) to pump the fluid (104) giving good heat conduction performance to execute one-way continuous or intermittent pumping or to control and regulate the pumped flow rate of the fluid (104) to constitute the function of temperature equalization between the heat equalizer (102) and the semiconductor application installation (103).

The operation of heat equalization between the heat equalizer (102) and the semiconductor application installation (103) of the system as illustrated in FIG. 3 is achieved by having provided the fluid transmission duct (105) that allows the fluid (104) to pass through and the pump (106), and having the pump (106) to pump the fluid (104) to execute continuous or intermittent pumping in a flowing direction of periodical exchange thus to equalize the temperature difference between the heat equalizer (102) and the semiconductor application installation (103).

The system illustrated in FIG. 1 and FIG. 3 can directly have a heat pipe giving good heat conduction of the prior art provided at where between the heat equalizer (102) and the semiconductor application installation (103) to replace the fluid transmission duct (105), or to replace the optional bypass duct (119) to provide the function of temperature equalization.

In the operation method of heat equalization between the heat equalizer (102) and the relay heat equalizer (202) of the system as illustrated in FIG. 2, at least one of the fluid transmission duct (205) that allows the fluid (204) to pass through and at least one of the relay pump (206) are disposed at where between the heat equalizer (102) and the relay heat equalizer (202) to constitute a closed loop of flow passage; and having the relay pump (206) to pump the fluid (204) giving good heat conduction performance to execute one-way continuous or intermittent pumping or to control and regulate the pumped flow rate of the fluid (204) to provide the function of temperature equalization between the heat equalizer (102) and the relay heat equalizer (202);

The operation of the heat equalization between the relay heat equalizer (202) and the semiconductor application installation (103) of the system as illustrated in FIG. 2 is achieved by having provided at least one of the fluid transmission duct (105) and at least one of the pump (106) disposed at where between the relay heat equalizer (202) and the semiconductor application installation (103) to constitute a closed loop of flow passage; and having the pump (106) to pump the fluid (104) giving good heat conduction performance to execute one-way continuous or intermittent pumping or to control and regulate the pumped flow rate of the fluid (104), thus to equalize the temperature difference between the relay heat equalizer (202) and the semiconductor application installation (103).

In the operation method of the heat equalization between the heat equalizer (102) and the relay heat equalizer (202) of the system as illustrated in FIG. 4, the fluid transmission duct (205) that allows the fluid (204) to pass through and the relay pump (206) are disposed at where between one or a plurality of relay heat equalizer (202) and one or a plurality of heat equalizer (102); and having the relay pump (206) to pump the fluid (204) giving good heat conduction performance to execute continuous or intermittent pumping in a flowing direction of periodical exchange to equalize the temperature difference between the heat equalizer (102) and the relay heat equalizer (202);

The operation of the heat equalization between the relay heat equalizer (202) and the semiconductor application installation (103) of the system as illustrated in FIG. 4 is achieved by having provided the fluid transmission duct (105) that allows the fluid (104) to pass through and the pump (106) at where between the relay heat equalizer (202) and the semiconductor application installation (103), and having the pump (106) to pump the fluid (104) to execute continuous or intermittent pumping in a flowing direction of periodical exchange thus to equalize the temperature difference between the relay heat equalizer (202) and the semiconductor application installation (103).

The system illustrated in FIG. 2 and FIG. 4 can directly have a heat pipe giving good heat conduction of the prior art provided at where between the heat equalizer (102) and the relay heat equalizer (202) to replace the fluid transmission duct (205), or provided at where between the relay heat equalizer (202) and the semiconductor application installation (103) to replace the fluid transmission duct (105) or to replace the optional bypass duct (119) to provide the function of temperature equalization.

The relay pump (206) disposed between the heat equalizer (102) and the relay heat equalizer (202) to pump the fluid (204), and the pump (106) disposed between the relay heat equalizer (202) and the semiconductor application installation (103) to pump the fluid (104) as illustrated in FIG. 2, FIG. 4 and described above can take place at the same time or not in executing periodical change of the two-way flow pumping; or either of the pump (106) and the relay pump (206) is selected to execute one-way continuous or intermittent pumping while the other pump executes the continuous or intermittent pumping for periodical change of the flow direction.

The pump (106) or the relay pump (206) described related to the temperature unifying and heat storing system of semiconductor heat loss through natural temperature maintaining member of the present invention is made any of the following modes:

1) Only one pump executes one-way continuous pumping; or
2) Only one pump executes one-way intermittent pumping; or
3) Only one pump executes one-way pumping to periodically change the flow direction of the fluid pumped through the control by a valve allowing variable flow direction; or
4) Multiple pumps with different power sources execute pumping in different directions at the same time, or separately execute pumping in periodically changed flow direction of the fluid pumped; or
5) Multiple pumps in different flow directions are driven at the same time by the same power source to execute continuous pumping in different flow directions, or to further execute periodical change of the flow direction of the fluid pumped; or
6) A two-way pump capable of alternatively executing pumping directions is used to periodically change the flow direction of the fluid pumped by changing the revolving direction of the power source.

The fluid transmission duct (105), or the fluid transmission duct (205), or the optional bypass duct (119) as described related to the temperature unifying and heat storing system of semiconductor heat loss through natural temperature maintaining member is made of a material giving good heat accumulation property and in construction depending on the length needed and the specific geometric form, e.g., the duct is made in curvature, labyrinth, or vortex form, and buried in the natural heat carrier (101) to replace or support the heat equalizer (102) in achieving heat equalization between the heat equalizer (102) and the natural heat carrier (101).

The temperature unifying and heat storing system of semiconductor heat loss through natural temperature maintaining member as described related to the temperature unifying and heat storing system of semiconductor heat loss through natural temperature maintaining member can further be selectively provided with the following auxiliary control devices as applicable, which comprises:

a filter (108): to be mounted to the fluid inlet or the outlet of each item or in the fluid transmission duct of the system to prevent the duct from being plugged and to clean the fluid; the filter is comprised of a strainer or any other filtering device of the prior art, and the filter relates to an optional item to be provided as applicable; and a bypass control valve (120): relates to a valve for controlling the flow rate of the fluid by manual, mechanical force, fluid force, or electromagnetic force, and the valve is also related to an optional item to be provided as applicable.

In the temperature unifying and heat storing system of semiconductor heat loss through natural temperature maintaining member, when directly using the fluid to operate the temperature equalization and heat storage function, those items including the heat equalizer (102), the semiconductor application installation (103), the fluid (104), the fluid transmission duct (105), the pump (106), and those optional items including the temperature detection device (107), the filter (108), the auxiliary temperature regulation device (109), the control unit (110), the fluid bypass duct (119), the bypass control valve (120), and the bypass auxiliary pump (121) are provided in only one unit or in multiple units. When multiple units are provided for each item, the specification or the material can vary as applicable.

In the temperature unifying and heat storing system of semiconductor heat loss through natural temperature maintaining member, when a relay heat equalizer is additionally installed to indirectly transfer the thermal energy, those items including the heat equalizer (102), the semiconductor application installation (103), the fluid (104), the fluid transmission duct (105), the pump (106), the relay heat equalizer (202), another fluid (204), the relay pump (206), and those optional items including the temperature detection device (107), the filter (108), the auxiliary temperature regulation device (109), the control unit (110), the fluid bypass duct (119), the bypass control valve (120), and the bypass auxiliary pump (121) are provided in only one unit or in multiple units. When two or more than two units are provided for each item, the specification or the material is same or different as applicable.

Figure 5:
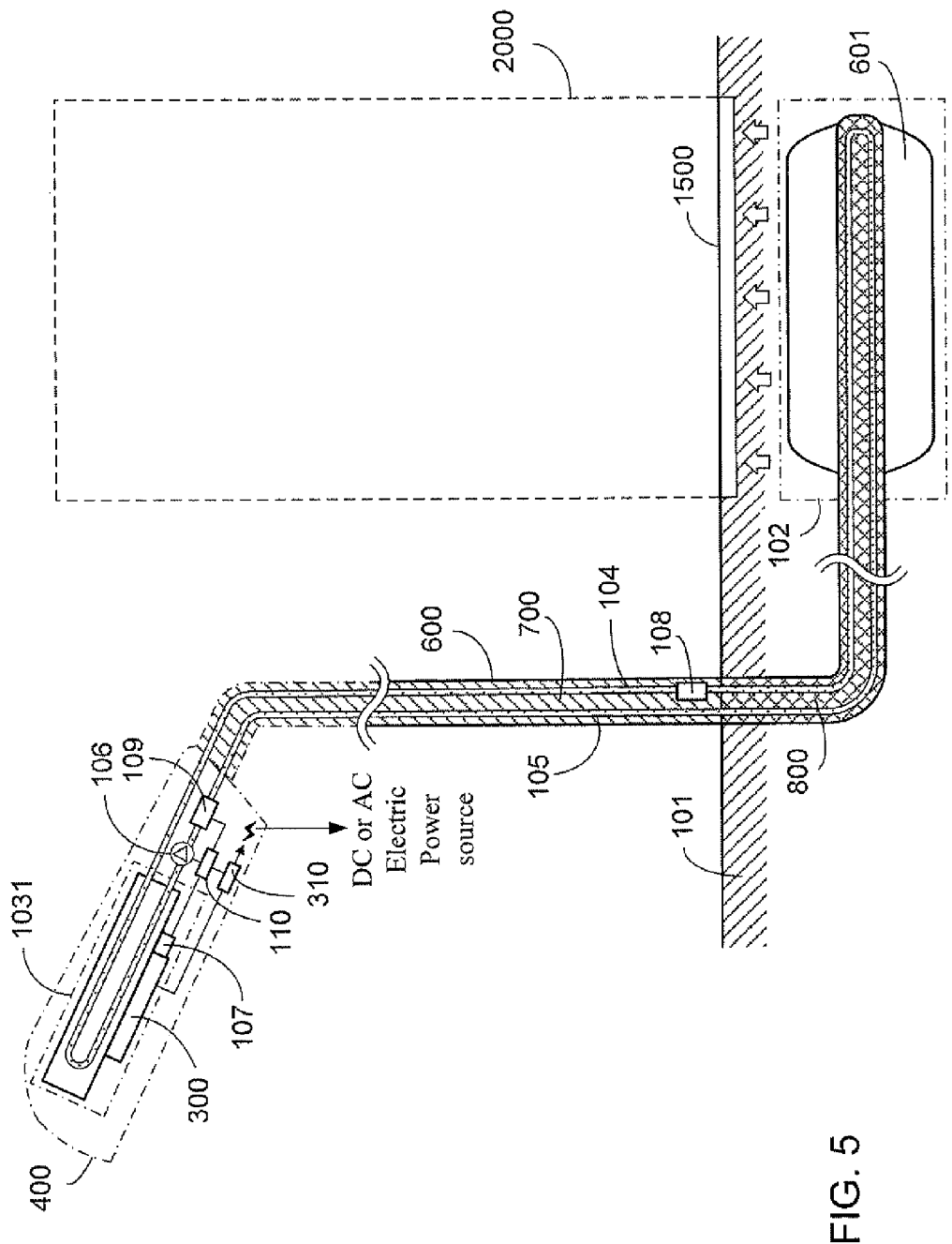
FIG. 5 is a schematic view showing the embodiment of the present invention in the application of street lamp consisting of the semiconductor application installation constituted by the LED or gas state lamp with heat dissipation structure at the back.

The schematic illustrated in FIG. 5 shows the embodiment of the present invention in the application of street lamp consisting of the semiconductor application installation constituted by the LED or gas state lamp with heat dissipation structure at the back, which is through the thermal energy of the natural heat carrier (101) consists of solid state natural heat carrier including stratum, surface of earth or desert where presents comparatively larger and more reliable heat carrying capacity to execute temperature equalization to the heat generated by the semiconductor application installation constituted by the LED or gas state lamp with heat dissipation structure at the back (1031), wherein the main constitution is to be disposed with at least a fluid transmission duct (105), and is through pumping by the pump (106), or through driven by the convection effect caused by the rising hot fluid and sinking cold fluid, or through the fluid enabling the fluid to flow through the semiconductor application installation constituted by the LED or gas state lamp with heat dissipation structure at the back (1031), and further through the fluid transmission duct (105) to flow back to the heat equalizer (102) disposed in the natural heat carrier (101), thereby constituting the circulation of fluid; the system is essentially comprised of:

the heat equalizer (102): relates to one made of a material with good heat conduction performance and constructed in a way to provide good heat conduction with the natural heat carrier (101); the heat equalizer (102) is provided with a fluid inlet, a fluid outlet, and an internal fluid passage; or the space inside the natural heat carrier (101) allowing the fluid to flow forthwith directly constitutes the heat storage function of the heat equalizer (102), thereby replacing the heat equalizer (102) which is made of a material with good heat conduction performance; or both of the heat equalizer (102) and the space inside the natural heat carrier (101) are provided at the same time; the heat equalizer (102) can also consist of the duct of a support (600) that buried into the natural heat carrier (101); the constitution comprises one or more than one heat equalizers (102) performing temperature equalization to the same temperature unifying and heat storing system of semiconductor heat loss through natural temperature maintaining member consisting of the semiconductor application installation constituted by the LED or gas state lamp with heat dissipation structure at the back (1031), or one heat equalizer (102) performing temperature equalization to one or more than one independently disposed temperature unifying and heat storing system of semiconductor heat loss through natural temperature maintaining member consisting of the semiconductor application installation constituted by the LED or gas state lamp with heat dissipation structure at the back (1031), or two or more than two heat equalizers (102) performing temperature equalization to two or more than two independently disposed temperature unifying and heat storing systems of semiconductor heat loss through natural temperature maintaining member consisting of the semiconductor application installation constituted by the LED or gas state lamp with heat dissipation structure at the back (1031), and through the heat equalizer (102) to transfer thermal energy to the heat storing block (1500) constituted by the surrounding natural heat carrier so as to store heat for releasing thermal energy to the specified heat releasing target (2000);

specified heat releasing target (2000): it relates to the surface of earth of the heat storing block (1500) constituted by the natural heat carrier adjacent to the surrounding of the heat equalizer (102), such as the ground, a road surface or a floor of a building, or a wall recessed into the ground;

semiconductor application installation constituted by the LED or gas state lamp with heat dissipation structure at the back (1031): it is constituted by an Light Emitting Diode (LED) lamp or gas state lamp (300) and the disposed heat dissipation device, and the heat dissipation device is further disposed with the fluid transmission duct (105) for passing the fluid (104);

driving control circuit (310): it relates to switch function for control of input electrical energy, to drive the LED or gas state lamp (300), and to execute switching on or off, the brightness control or the timing of switching on or off according to the settings, and accepting the signal of temperature detection device (107) for controlling system to reduce load or cut off power when the system temperature is abnormal; wherein the methods of reducing electrical loading power stated above comprise variation of the power voltage, or variation of the load resistance to reduce input electrical power or cut off part of the loading; the timing of the driving control circuit (310) in supplying power to activate system comprises manual operation, timed setting, random signal driving, and the brightness of the ambient as a reference, particularly when the system is activated due to the ambient turns from brightness to darkness; the timing to switch the system comprises manual operation, timed setting, random signal driving, and the brightness of the ambient as a reference, particularly when the system is closed due to the ambient turns from darkness to brightness; the driving control circuit (310) can be disposed independently or be disposed to the heat dissipation device of the semiconductor application installation constituted by the LED or gas state lamp with heat dissipation structure at the back (1031) for jointly performing temperature equalization through the natural heat carrier (101);

the fluid (104): it relates to a gas or a liquid provided to execute the function of heat transmission; the fluid (104) is pumped by the pump (106) to flow through the heat equalizer (102) disposed in the natural heat carrier (101), the fluid transmission duct (105), the optionally installed semiconductor application installation constituted by the LED or gas state lamp with heat dissipation structure at the back (1031), and further through the fluid transmission duct (105) to flow back to the heat equalizer (102) to complete the circulation for the operation to provide temperature equalization; or by means of the effects of hot fluid rising and cold fluid sinking to form the circulation for execution of temperature equalization function;

the fluid transmission duct (105): it relates to a duct structure provided at where between the heat equalizer (102) and the semiconductor application installation constituted by the LED or gas state lamp with heat dissipation structure at the back (1031) and connected in series with the pump (106) for the fluid (104) to circulate; to facilitate maintenance, an optional structure to open or to draw is provided to the fluid transmission duct (105) as applicable;

the pump (106): it relates to a fluid pump driven by electric power, mechanical force, manpower, or any other natural force as the power source, being connected in series with the fluid transmission duct (105), and subject to the control by a control unit (110) to pump the fluid (104); this pumping function can be replaced by the convection effects caused by the rising hot fluid and sinking cold fluid;

a temperature detector device (107): it is related to analog or digital dynamo-electric or solid state electronic devices of the prior art, and is disposed in the semiconductor application installation constituted by the LED or gas state lamp with heat dissipation structure at the back (1031) to indicate the temperature, or to provide signal feedback to the control unit (110) and/or the driving control circuit (310), and through controlling the pump (106) to operate or stop enabling the system to operate in programmed temperature range, and an auxiliary temperature regulating device (109) is disposed in the system and is activated when the pump (106) operates to reach the programmed time but the temperature yet still unable to operate in the programmed range; this device is optionally installed or not installed as applicable;

a filter (108): it is provided at the fluid suction inlet or outlet of each device mounted to the fluid circulation loop, or at a selected location in the fluid transmission duct (105) to filter fluid foreign material, prevent the duct from getting plugged and assure of clean fluid; the filter (108) is optionally installed or not installed as applicable;

an auxiliary temperature regulation device (109): it is related to dynamo-electric solid, gas or liquid state temperature regulation device to heat or cool the fluid (104), or a electric heating or cooling device comprised of solid state or semiconductor, as subject to the control by the control unit (110) to activate the auxiliary temperature regulating device (109) when the system temperature drifting programmed range, thereby to regulate the temperature by heating or cooling to the heating or cooling location of the fluid (104); this device is optionally installed or not installed as applicable; and the control unit (110): it is comprised of dynamo-electric or solid state electronic circuit and related software, and is served to control the fluid pump (106) to pump the fluid (104) in continuous operation or intermittent operation according to the temperature detection signal and system temperature setting of the temperature detection device (107), and to control the direction and flow rate of the fluid (104) between the heat equalizer (102) and the semiconductor application installation constituted by the LED or gas state lamp with heat dissipation structure at the back (1031); and by means of controlling the operation or stop of the pump (106) for the system to operate in the programmed temperature range, and to activate and operatively control the auxiliary temperature regulating device (109) disposed in the system for performing auxiliary temperature regulation when the pump (106) operates to reach the programmed time but the temperature yet still unable to operate in the programmed range; as well as to control system to reduce the load or cut off the power supply when the system temperature is abnormal;

support (600): it relates to one or more than one pillar or frame structure, and the low end is disposed with the heat equalizer (102) disposed in the natural heat carrier (101), wherein the heat equalizer (102) is disposed with thermal conduction wing (601) depending on the need to increase heat conduction effect, and the support (600) is also served to be disposed with the semiconductor application installation constituted by the LED or gas state lamp with heat dissipation structure at the back (1031) constituted by the LED or gas state lamp (300) and its disposed heat dissipation device and the optical and housing structure of related lamp (400), as well as the below part or all unit devices including the controlling unit (110), the pump (106), the temperature detector device (107), and filter (108); above stated semiconductor application installation constituted by the LED or gas state lamp with heat dissipation structure at the back (1031) disposed at the support (600) is provided with the fluid transmission duct, and the fluid inlet and outlet are respectively for connecting to the fluid transmission duct (105) for leading to the heat equalizer (102) to form a closed flow passage; the internal of fluid transmission duct (105) is for flowing the fluid (104); the fluid (104) executes circulation through the convection effect causing by the hot fluid rising and cold fluid sinking, or is pumped by the additionally installed pump (106), thereby for the fluid (104) to execute temperature equalizing transmission between the heat equalizer (102) and the semiconductor application installation constituted by the LED or gas state lamp with heat dissipation structure at the back (1031);

heat insulating material (700): it relates to all kinds of heat insulating material for disposing between the support (600) exposed out of the natural heat carrier (101) and the internal of fluid transmission duct (105) to provide heat insulation effect to the outside, so as to reduce thermal energy from escaping; such heat insulating material (700) is optionally disposed according to the need; the insulating material can be replaced by extracting air to achieve vacuum effect, and if the support (600) is made of material with better heat insulating material, or if the fluid transmission duct (105) is made of structure with heat insulating material, the insulating material (700) is optionally not installed;

heat conductor (800): it relates to a material made of heat conducting material for being disposed between the inside of the root duct of the natural heat carrier (101) and the fluid transmission duct (105) to facilitate the temperature equalizing effect of the fluid (104) of fluid transmission duct (105) to the natural temperature carrier (101) through heat equalizer (102); heat conductor can be an integral body with the heat equalizer (102).

Figure 6:
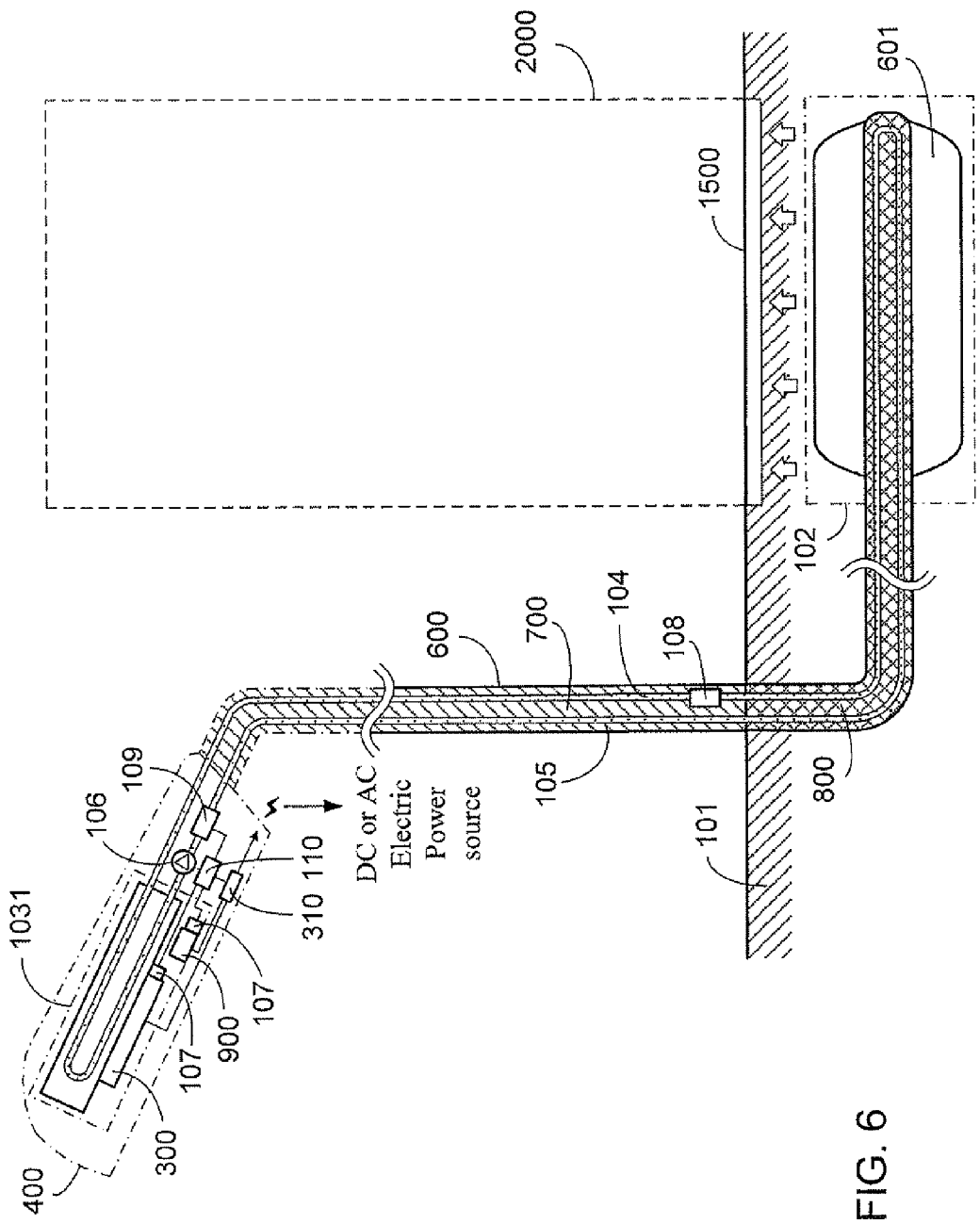
FIG. 6 is a schematic view of the embodiment of the street lamp consisting of the semiconductor application installation constituted by the LED or gas state lamp with heat dissipation structure at the back.

FIG. 6 is the schematic showing the embodiment of the street lamp consisting of the semiconductor application installation constituted by the LED or gas state lamp with heat dissipation structure at the back (1031) of FIG. 5 being further disposed with an electricity storage device, which is through the thermal energy of the natural heat carrier (101) consists of solid state natural heat carrier including stratum, surface of earth or desert where presents comparatively larger and more reliable heat carrying capacity to execute temperature equalization to the heat generated by the semiconductor application installation constituted by the LED or gas state lamp with heat dissipation structure at the back (1031) and the electricity storage device (900), wherein the main constitution is to be disposed with at least a fluid transmission duct (105), and is through pumping by the pump (106), or through driven by the convection effect caused by rising hot fluid and sinking cold fluid, or through the fluid enabling the fluid to flow through the semiconductor application installation constituted by the LED or gas state lamp with heat dissipation structure at the back (1031) and the electricity storage device (900), and further through the fluid transmission duct (105) to flow back to the heat equalizer (102) disposed in the natural heat carrier (101), thereby constituting the circulation of fluid; the system is essentially comprised of:

the heat equalizer (102): relates to one made of a material with good heat conduction performance and constructed in a way to provide good heat conduction with the natural heat carrier (101); the heat equalizer (102) is provided with a fluid inlet, a fluid outlet, and an internal fluid passage; or the space inside the natural heat carrier (101) allowing the fluid to flow forthwith directly constitutes the heat storage function of the heat equalizer (102), thereby replacing the heat equalizer (102) which is made of a material with good heat conduction performance; or both of the heat equalizer (102) and the space inside the natural heat carrier (101) are provided at the same time; the heat equalizer (102) can also consist of the duct of a support (600) that buried into the natural heat carrier (101); the constitution comprises one or more than one heat equalizers (102) performing temperature equalization to the same temperature unifying and heat storing system of semiconductor heat loss through natural temperature maintaining member consisting of the semiconductor application installation constituted by the LED or gas state lamp with heat dissipation structure at the back (1031) and/or the electricity storage device (900); or one heat equalizer (102) performing temperature equalization to one or more than one independently disposed temperature unifying and heat storing systems of semiconductor heat loss through natural temperature maintaining member consisting of the semiconductor application installation constituted by the LED or gas state lamp with heat dissipation structure at the back (1031) and/or the electricity storage device (900); or two or more than two heat equalizers (102) performing temperature equalization to two or more than two independently disposed temperature unifying and heat storing systems of semiconductor heat loss through natural temperature maintaining member consisting of the semiconductor application installation constituted by the LED or gas state lamp with heat dissipation structure at the back (1031) and/or the electricity storage device (900), and through the heat equalizer (102) to transfer thermal energy to the heat storing block (1500) constituted by the surrounding natural heat carrier so as to store heat for releasing thermal energy to the specified heat releasing target (2000);

specified heat releasing target (2000): it relates to the surface of earth of the heat storing block (1500) constituted by the natural heat carrier adjacent to the surrounding of the heat equalizer (102), such as the ground, a road surface or a floor of a building, or a wall recessed into the ground;

semiconductor application installation constituted by the LED or gas state lamp with heat dissipation structure at the back (1031): it is constituted by an Light Emitting Diode (LED) lamp or gas state lamp (300) and the disposed heat dissipation device, and the heat dissipation device is further disposed with the fluid transmission duct (105) for passing the fluid (104);

driving control circuit (310): it relates to switch function for control of input electrical energy, to drive the LED or gas state lamp (300), and to execute switching on or off, the brightness control or the timing of switching on or off according to the settings, and accepting the signal of temperature detection device (107) for controlling system to reduce load or cut off power when the system temperature is abnormal; wherein the methods of reducing electrical loading power stated above comprise variation of the power voltage, or variation of the load resistance to reduce input electrical power or cut off part of the loading; the timing of the driving control circuit (310) in supplying power to activate system comprises manual operation, timed setting, random signal driving, and the brightness of the ambient as a reference, particularly when the system is activated due to the ambient turns from brightness to darkness; the timing to switch the system comprises manual operation, timed setting, random signal driving, and the brightness of the ambient as a reference, particularly when the system is closed due to the ambient turns from darkness to brightness; the driving control circuit (310) can be disposed independently or be disposed to the heat dissipation device of the semiconductor application installation constituted by the LED or gas state lamp with heat dissipation structure at the back (1031) for jointly performing temperature equalization through the natural heat carrier (101);

electricity storage device (900): it relates to constituents of all kinds of rechargeable secondary batteries or capacitors or super capacitors, for storing energy and providing electricity for the LED or gas state lamp (300); the electricity energy storage device (900) is disposed with the temperature detection device (107) and the fluid transmission duct (105), depending on the need;

the fluid (104): it relates to a gas or a liquid provided to execute the function of heat transmission; the fluid (104) is pumped by the pump (106) to flow through the heat equalizer (102) disposed in the natural heat carrier (101), the fluid transmission duct (105), and optionally flows serially or in parallel through the semiconductor application installation constituted by the LED or gas state lamp with heat dissipation structure at the back (1031) and/or the electrical energy storage device (900), and further through the fluid transmission duct (105) to flow back to the heat equalizer (102) to complete the circulation for the operation to provide temperature equalization; or by means of the effects of hot fluid rising and cold fluid sinking to form the circulation for execution of temperature equalization function;

the fluid transmission duct (105): it relates to a duct structure provided at where between the heat equalizer (102) and the semiconductor application installation constituted by the LED or gas state lamp with heat dissipation structure at the back (1031) and/or the electricity storage device (900), and connected in series with the pump (106) for the fluid (104) to circulate; to facilitate maintenance, an optional structure to open or to draw is provided to the fluid transmission duct (105) as applicable;

the pump (106): it relates to a fluid pump driven by electric power, mechanical force, manpower, or any other natural force as the power source, being connected in series with the fluid transmission duct (105), and subject to the control by a control unit (110) to pump the fluid (104); this pumping function can be replaced by the convection effects caused by the rising hot fluid and sinking cold fluid;

a temperature detector device (107): it is related to analog or digital dynamo-electric or solid state electronic device of the prior art, and is disposed in the semiconductor application installation constituted by the LED or gas state lamp with heat dissipation structure at the back (1031) and/or the electrical energy storage device (900) to indicate the temperature, or to provide signal feedback to the control unit (110) and/or the driving control circuit (310), and through controlling the pump (106) to operate or stop enabling the system to operate in programmed temperature range, and an auxiliary temperature regulating device (109) is disposed in the system and is activated when the pump (106) operates to reach the programmed time but the temperature yet still unable to operate in the programmed range; this device is optionally installed or not installed as applicable;

a filter (108): it is provided at the fluid suction inlet or outlet of each device mounted to the fluid circulation loop, or at a selected location in the fluid transmission duct (105) to filter fluid foreign material, prevent the duct from getting plugged and assure of clean fluid; the filter (108) is optionally installed or not installed as applicable;

an auxiliary temperature regulation device (109): it is related to dynamo-electric solid, gas or liquid state temperature regulation device to heat or cool the fluid (104), or a electric heating or cooling device comprised of solid state or semiconductor, as subject to the control by the control unit (110) to activate the auxiliary temperature regulating device (109) when the system temperature drifting programmed range, thereby to regulate the temperature by heating or cooling to the heating or cooling location of the fluid (104); this device is optionally installed or not installed as applicable; and the control unit (110): it is comprised of dynamo-electric or solid state electronic circuit and related software, and is served to control the fluid pump (106) to pump the fluid (104) in continuous operation or intermittent operation according to the temperature detection signal and system temperature setting of the temperature detection device (107), and to control the direction and flow rate of the fluid (104) between the heat equalizer (102) and the semiconductor application installation constituted by the LED or gas state lamp with heat dissipation structure at the back (1031) and/or the electrical energy storage device (900); and by means of controlling the operation or stop of the pump (106) for the system to operate in the programmed temperature range, and to activate and operatively control the auxiliary temperature regulating device (109) disposed in the system for performing auxiliary temperature regulation when the pump (106) operates to reach the programmed time but the temperature yet still unable to operate in the programmed range; as well as to control system to reduce the load or cut off the power supply when the system temperature is abnormal;

support (600): it relates to one or more than one pillar or frame structure, and the low end is disposed with the heat equalizer (102) disposed in the natural heat carrier (101), wherein the heat equalizer (102) is disposed with thermal conduction wing (601) depending on the need to increase heat conduction effect, and the support (600) is also served to be disposed to the semiconductor application installation constituted by the LED or gas state lamp with heat dissipation structure at the back (1031) constituted by the LED or gas state lamp (300) and the disposed heat dissipating device, and the optical and housing structure of related lamp (400), and the electricity storage device (900), as well as the below part or all unit devices including the controlling unit (110), the pump (106), the temperature detector device (107), and filter (108); above stated semiconductor application installation constituted by the LED or gas state lamp with heat dissipation structure at the back (1031) and/or the electricity storage device (900) disposed at the support (600) is provided with the fluid transmission duct, and the fluid inlet and outlet are respectively for connecting to the fluid transmission duct (105) for leading to the heat equalizer (102) to form a closed flow passage; the internal of fluid transmission duct (105) is for flowing the fluid (104); the fluid (104) executes circulation through the convection effect caused by the rising hot fluid and sinking cold fluid, or is pumped by the additionally installed pump (106), thereby for the fluid (104) to execute temperature equalizing transmission between the heat equalizer (102) and the semiconductor application installation constituted by the LED or gas state lamp with heat dissipation structure at the back (1031) and/or the electricity storage device (900);

heat insulating material (700): it relates to all kinds of heat insulating material for disposing between the support (600) exposed out of the natural heat carrier (101) and the internal of fluid transmission duct (105) to provide heat insulation effect to the outside, so as to reduce thermal energy from escaping; such heat insulating material (700) is optionally disposed according to the need; the insulating material can be replaced by extracting air to achieve vacuum effect, and if the support (600) is made of material with better heat insulating material, or if the fluid transmission duct (105) is made of structure with heat insulating material, the insulating material (700) is optionally not installed;

heat conductor (800): it relates to a material made of heat conducting material for being disposed between the inside of the root duct of the natural heat carrier (101) and the fluid transmission duct (105) to facilitate the temperature equalizing effect of the fluid (104) of fluid transmission duct (105) to the natural temperature carrier (101) through heat equalizer (102); heat conductor can be an integral body with the heat equalizer (102).

Figure 7:
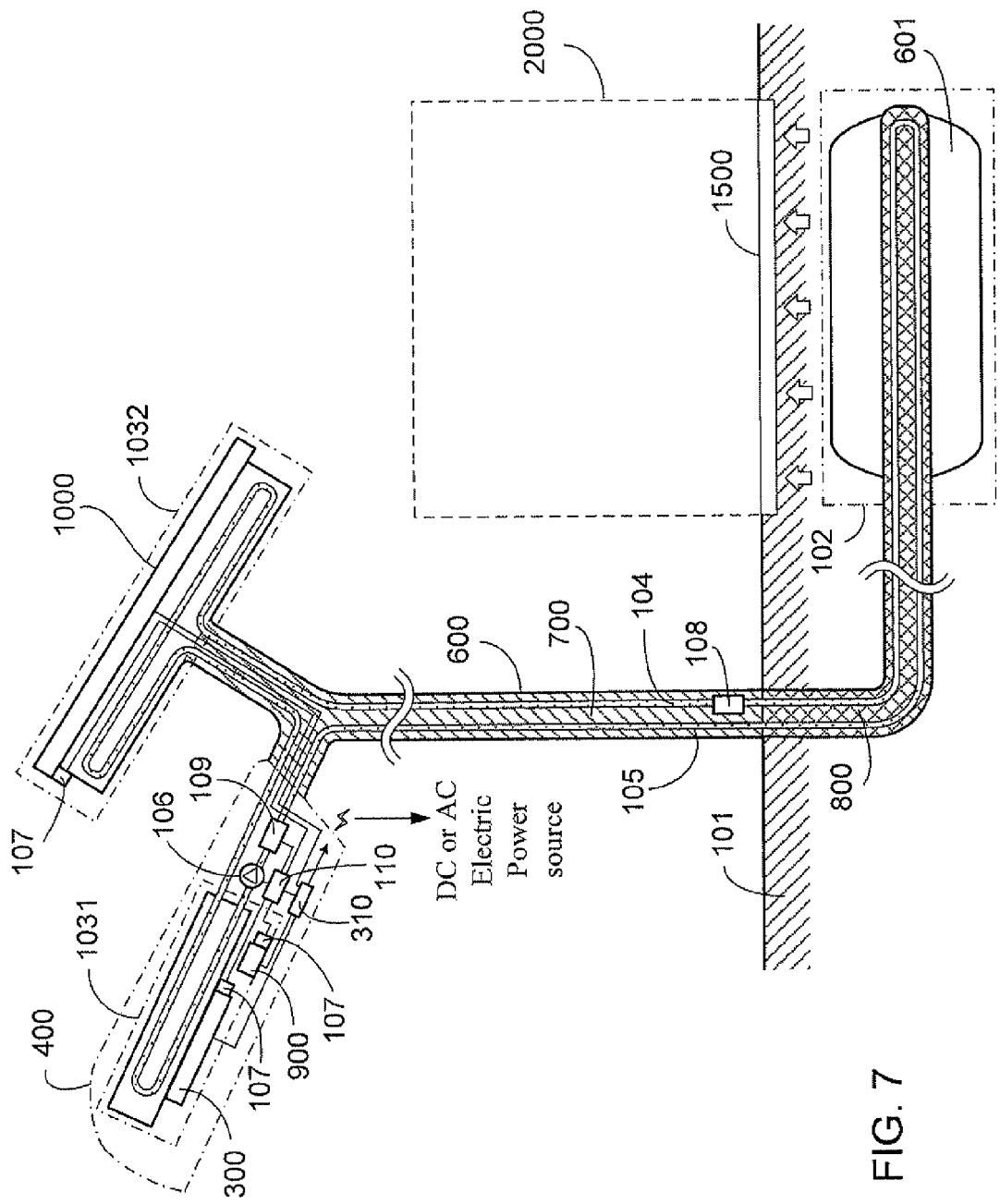
FIG. 7 is a schematic view of FIG. 6 further disposed with the photovoltaic generation device capable of transferring light energy to electrical energy.
Figure 8:
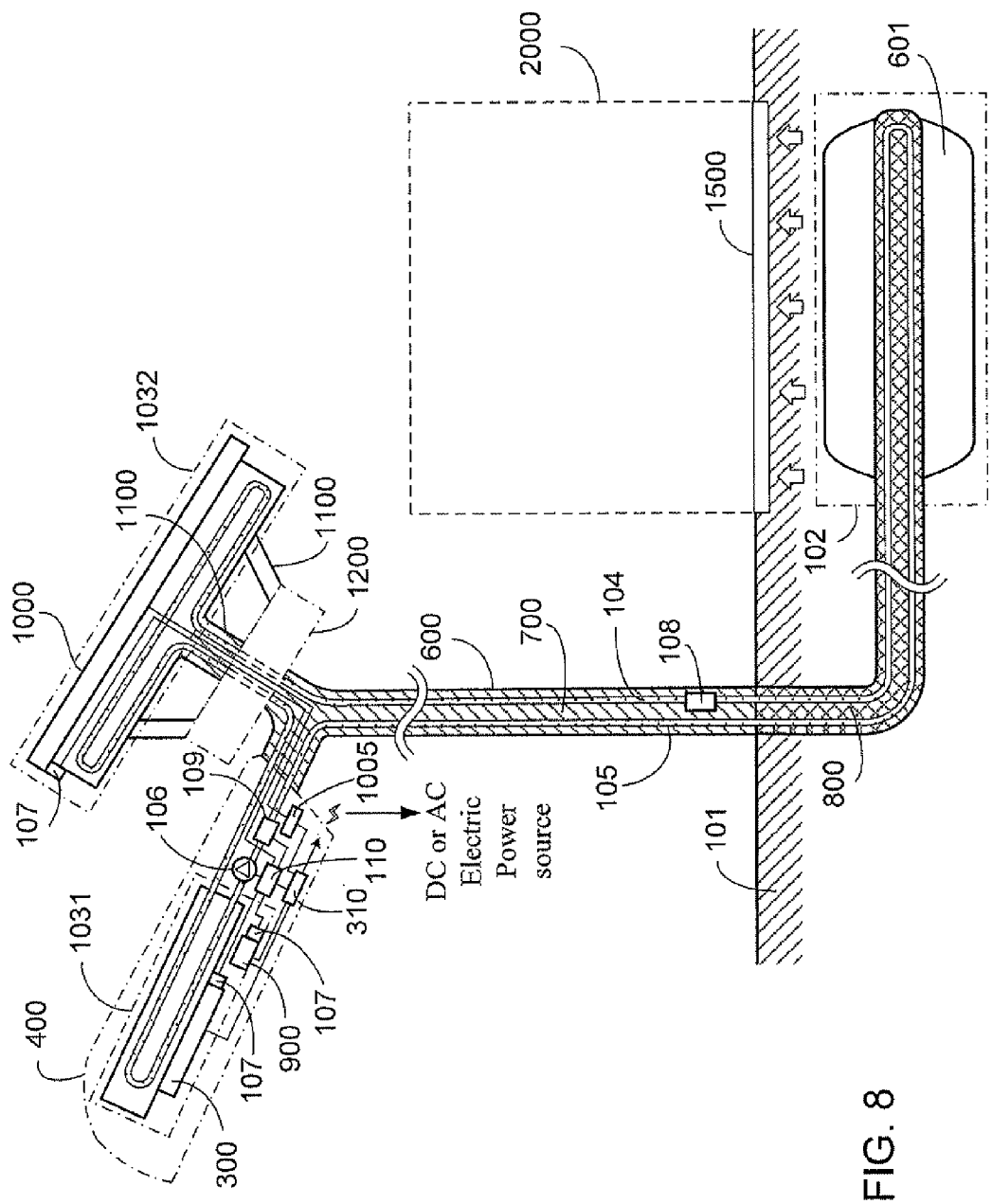
FIG. 8 is a schematic view of the embodiment showing the auxiliary supporting arm of the light source tracking mechanism device being additionally installed to the embodiment of FIG. 7.

FIG. 7 is the schematic of FIG. 6 further disposed with the photovoltaic generation device capable of transferring light energy to electrical energy, which is through the thermal energy of the natural heat carrier (101) consists of solid state natural heat carrier including stratum, surface of earth or desert where presents comparatively larger and more reliable heat carrying capacity to execute temperature equalization to the heat generated by the semiconductor application installation constituted by the LED or gas state lamp with heat dissipation structure at the back (1031) consisted of the LED or gas state lamp (300), and/or the semiconductor application installation constituted by the photovoltaic generation device of transferring light energy to electrical energy (1032) consisted of the photovoltaic generation device of transferring light energy to electrical energy (1000) and/or the electricity storage device (900); wherein the main constitution is to be disposed with at least a fluid transmission duct (105), and through pumping by the pump (106), or through driven by the convection effect caused by rising hot fluid and sinking cold fluid, or through the fluid enabling the fluid to flow through the semiconductor application installation constituted by the LED or gas state lamp with heat dissipation structure at the back (1031), and/or the semiconductor application installation constituted by the photovoltaic generation device of transferring light energy to electrical energy (1032), and/or the electricity storage device (900), then further through the fluid transmission duct (105) to flow back to the heat equalizer (102) disposed in the natural heat carrier (101), thereby constituting the circulation of fluid; its major structure comprising:

the heat equalizer (102): it relates to one made of a material with good heat conduction performance and constructed in a way to provide good heat conduction with the natural heat carrier (101); the heat equalizer (102) is provided with a fluid inlet, a fluid outlet, and an internal fluid passage; or the space inside the natural heat carrier (101) allowing the fluid to flow forthwith directly constitutes the heat storage function of the heat equalizer (102), thereby replacing the heat equalizer (102) which is made of a material with good heat conduction performance; or both of the heat equalizer (102) and the space inside the natural heat carrier (101) are provided at the same time; the heat equalizer (102) can also consist of the duct of a support (600) that buried into the natural heat carrier (101); the constitution comprises one or more than one heat equalizers (102) performing temperature equalization to the same temperature unifying and heat storing system of semiconductor heat loss through natural temperature maintaining member consisting of the semiconductor application installation constituted by the LED or gas state lamp with heat dissipation structure at the back (1031) and/or the semiconductor application installation constituted by the photovoltaic generation device with heat dissipation structure at the back (1032) and/or the electricity storage device (900); or one heat equalizer (102) performing temperature equalization to one or more than one independently disposed temperature unifying and heat storing system of semiconductor heat loss through natural temperature maintaining member consisting of the semiconductor application installation constituted by the LED or gas state lamp with heat dissipation structure at the back (1031) and/or the semiconductor application installation constituted by the photovoltaic generation device with heat dissipation structure at the back (1032) and/or the electricity storage device (900); or two or more than two heat equalizers (102) performing temperature equalization to two or more than two independently disposed temperature unifying and heat storing systems of semiconductor heat loss through natural temperature maintaining members consisting of the LED or gas state lamp constituted semiconductor application installation with heat dissipation structure at the back (1031) and/or the semiconductor application installation constituted by the photovoltaic generation device with heat dissipation structure at the back (1032) and/or the electricity storage device (900), and through the heat equalizer (102) to transfer thermal energy to the heat storing block (1500) constituted by the surrounding natural heat carrier so as to store heat for releasing thermal energy to the specified heat releasing target (2000);

specified heat releasing target (2000): it relates to the surface of earth of the heat storing block (1500) constituted by the natural heat carrier adjacent to the surrounding of the heat equalizer (102), such as the ground, a road surface or a floor of a building, or a wall recessed into the ground;

semiconductor application installation constituted by the LED or gas state lamp with heat dissipation structure at the back (1031): it is constituted by an Light Emitting Diode (LED) lamp or a gas state lamp (300) and the disposed heat dissipation device, and the heat dissipation device is further disposed with the fluid transmission duct (105) for passing the fluid (104);

driving control circuit (310): it relates to switch function for control of input electrical energy, to drive the LED or gas state lamp (300), and to execute switching on or off, the brightness control or the timing of switching on or off according to the settings, and accepting the signal of temperature detection device (107) for controlling system to reduce load or cut off power when the system temperature is abnormal; wherein the methods of reducing electrical loading power stated above comprise variation of the power voltage, or variation of the load resistance to reduce input electrical power or cut off part of the loading; the timing of the driving control circuit (310) in supplying power to activate system comprises manual operation, timed setting, random signal driving, and the brightness of the ambient as a reference, particularly when the system is activated due to the ambient turns from brightness to darkness; the timing to switch the system comprises manual operation, timed setting, random signal driving, and the brightness of the ambient as a reference, particularly when the system is closed due to the ambient turns from darkness to brightness; the driving control circuit (310) can be disposed independently or be disposed to the heat dissipation device of the semiconductor application installation constituted by the LED or gas state lamp with heat dissipation structure at the back (1031) for jointly performing temperature equalization through the natural heat carrier (101);

electricity storage device (900): it relates to constituents of all kinds of rechargeable secondary batteries or capacitors or super capacitors, for storing energy and providing electricity for the LED or gas state lamp (300); the electricity energy storage device (900) is disposed with the temperature detection device (107) and the fluid transmission duct (105), depending on the need;

semiconductor application installation constituted by the photovoltaic generation device with heat dissipation structure at the back (1032): it relates to the glass substrate or the section of semiconductor of photovoltaic, and is disposed with the photovoltaic generation device of transferring light energy to electrical energy (1000) having the heat dissipation structure being equipped with the fluid transmission duct, thereby when receiving the light, the generated electrical energy is transmitted to the electricity storing device (900) or is provided to the LED or gas state lamp (300);

electricity regulating device (1005): it is constituted by the dynamo or the solid state semiconductor circuit component or the integrated circuit for regulating the output voltage and electrical current of photovoltaic generation device of transferring light energy to electrical energy (1000);

the fluid (104): it relates to a gas or a liquid provided to execute the function of heat transmission; the fluid is pumped by the pump (106) to flow through the heat equalizer (102) disposed in the natural heat carrier (101), the fluid transmission duct (105), and optionally flows serially or in parallel through at least one of the three devices including the semiconductor application installation constituted by the LED or gas state lamp with heat dissipation structure at the back (1031), the electrical energy storage device (900), and the semiconductor application installation constituted by the photovoltaic generation device with heat dissipation structure at the back (1032), and further through the fluid transmission duct (105) to flow back to the heat equalizer (102) to complete the circulation for the operation to provide temperature equalization; or by means of the effects of hot fluid rising and cold fluid sinking to form the circulation for execution of temperature equalization function;

the fluid transmission duct (105): it relates to a duct structure provided at where between the heat equalizer (102) and at least one of the three devices including the semiconductor application installation constituted by the LED or gas state lamp with heat dissipation structure at the back (1031), the electrical energy storage device (900), and the semiconductor application installation constituted by the photovoltaic generation device with heat dissipation structure at the back (1032), and is connected in series with the pump (106) for the fluid (104) to circulate; to facilitate maintenance, an optional structure to open or to draw is provided to the fluid transmission duct (105) as applicable;

the pump (106): it relates to a fluid pump driven by electric power, mechanical force, manpower, or any other natural force as the power source, being connected in series with the fluid transmission duct (105), and subject to the control by a control unit (110) to pump the fluid (104); this pumping function can be replaced by the convection effects caused by the rising hot fluid and sinking cold fluid;

a temperature detector device (107): it is related to analog or digital dynamo-electric or solid state electronic device of the prior art, and is disposed in the semiconductor application installation constituted by the LED or gas state lamp with heat dissipation structure at the back (1031), and/or the semiconductor application installation constituted by the photovoltaic generation device with heat dissipation structure at the back (1032), and/or the electricity storage device (900) to indicate the temperature, or to provide signal feedback to the control unit (110) and/or the electricity regulating device (1005), and through controlling the pump (106) to operate or stop enabling the system to operate in programmed temperature range, and an auxiliary temperature regulating device (109) is disposed in the system and is activated when the pump (106) operates to reach the programmed time but the temperature yet still unable to operate in the programmed range; this device is optionally installed or not installed as applicable;

a filter (108): it is provided at the fluid suction inlet or outlet of each device mounted to the fluid circulation loop, or at a selected location in the fluid transmission duct (105) to filter fluid foreign material, prevent the duct from getting plugged and assure of clean fluid; the filter (108) is optionally installed or not installed as applicable;

an auxiliary temperature regulation device (109): it is related to dynamo-electric solid, gas or liquid state temperature regulation device to heat or cool the fluid (104), or a electric heating or cooling device comprised of solid state or semiconductor, as subject to the control by the control unit (110) to activate the auxiliary temperature regulating device (109) when the system temperature drifting programmed range, thereby to regulate the temperature by heating or cooling to the heating or cooling location of the fluid (104); this device is optionally installed or not installed as applicable; and the control unit (110): it is comprised of dynamo-electric or solid state electronic circuit and related software, and is served to control the fluid pump (106) to pump the fluid (104) in continuous operation or intermittent operation according to the temperature detection signal and system temperature setting of the temperature detection device (107), and to control the direction and flow rate of the fluid (104) between the heat equalizer (102) and the semiconductor application installation constituted by the LED or gas state lamp with heat dissipation structure at the back (1031), and/or the semiconductor application installation constituted by the photovoltaic generation device with heat dissipation structure at the back (1032), and/or the electricity storage device (900); and by means of controlling the operation or stop of the pump (106) for the system to operate in the programmed temperature range, and to activate and operatively control the auxiliary temperature regulating device (109) disposed in the system for performing auxiliary temperature regulation when the pump (106) operates to reach the programmed time but the temperature yet still unable to operate in the programmed range; as well as to control system to reduce the load or cut off the power supply when the system temperature is abnormal;

support (600); it relates to one or more than one pillar or frame structure, and the low end is disposed with the heat equalizer (102) disposed in the natural heat carrier (101), wherein the heat equalizer (102) is disposed with thermal conduction wing (601) depending on the need to increase heat conduction effect, and the support (600) is also served to be disposed to the semiconductor application installation constituted by the LED or gas state lamp with heat dissipation structure at the back (1031), and the optical and housing structure of related lamp (400), and the semiconductor application installation constituted by the photovoltaic generation device with heat dissipation structure at the back (1032) and the electricity storage device (900), as well as the below part or all unit devices including the controlling unit (110), the pump (106), the temperature detector device (107), and filter (108), wherein the semiconductor application installation constituted by the photovoltaic generation device with heat dissipation structure at the back (1032) is optionally disposed at the high end or the middle section of the support or an auxiliary supporting arm (1100) is additionally installed, or as illustrated in FIG. 8 additional auxiliary supporting arm (1100) of light source tracking device (1200) is disposed for tracking the light source, thereby improving the efficiency of the semiconductor application installation constituted by the photovoltaic generation device with heat dissipation structure at the back (1032); above stated the semiconductor application installation constituted by the LED or gas state lamp with heat dissipation structure at the back (1031), and/or the semiconductor application installation constituted by the photovoltaic generation device with heat dissipation structure at the back (1032), and/or the electricity storage device (900) disposed at the support (600) is provided with the fluid transmission duct, and the fluid inlet and outlet are respectively for connecting to the fluid transmission duct (105) for leading to the heat equalizer (102) to form a closed flow passage; the internal of fluid transmission duct (105) is for flowing the fluid (104); the fluid (104) executes circulation through the convection effect caused by the rising hot fluid and sinking cold fluid, or is pumped by the additionally installed pump (106), thereby for the fluid (104) to execute temperature equalizing transmission between heat equalizer (102) and the semiconductor application installation constituted by the LED or gas state lamp with heat dissipation structure at the back (1031), and/or the semiconductor application installation constituted by the photovoltaic generation device with heat dissipation structure at the back (1032), and/or the electricity storage device (900);

heat insulating material (700): it relates to all kinds of heat insulating material for disposing between the support (600) exposed out of the natural heat carrier (101) and the internal of fluid transmission duct (105) to provide heat insulation effect to the outside, so as to reduce thermal energy from escaping; such heat insulating material (700) is optionally disposed according to the need; the insulating material can be replaced by extracting air to achieve vacuum effect, and if the support (600) is made of material with better heat insulating material, or if the fluid transmission duct (105) is made of structure with heat insulating material, the insulating material (700) is optionally not installed;

heat conductor (800): it relates to a material made of heat conducting material for being disposed between the inside of the root duct of the natural heat carrier (101) and the fluid transmission duct (105) to facilitate the temperature equalizing effect of the fluid (104) of fluid transmission duct (105) to the natural temperature carrier (101) through heat equalizer (102); heat conductor can be an integral body with the heat equalizer (102).

Figure 9:
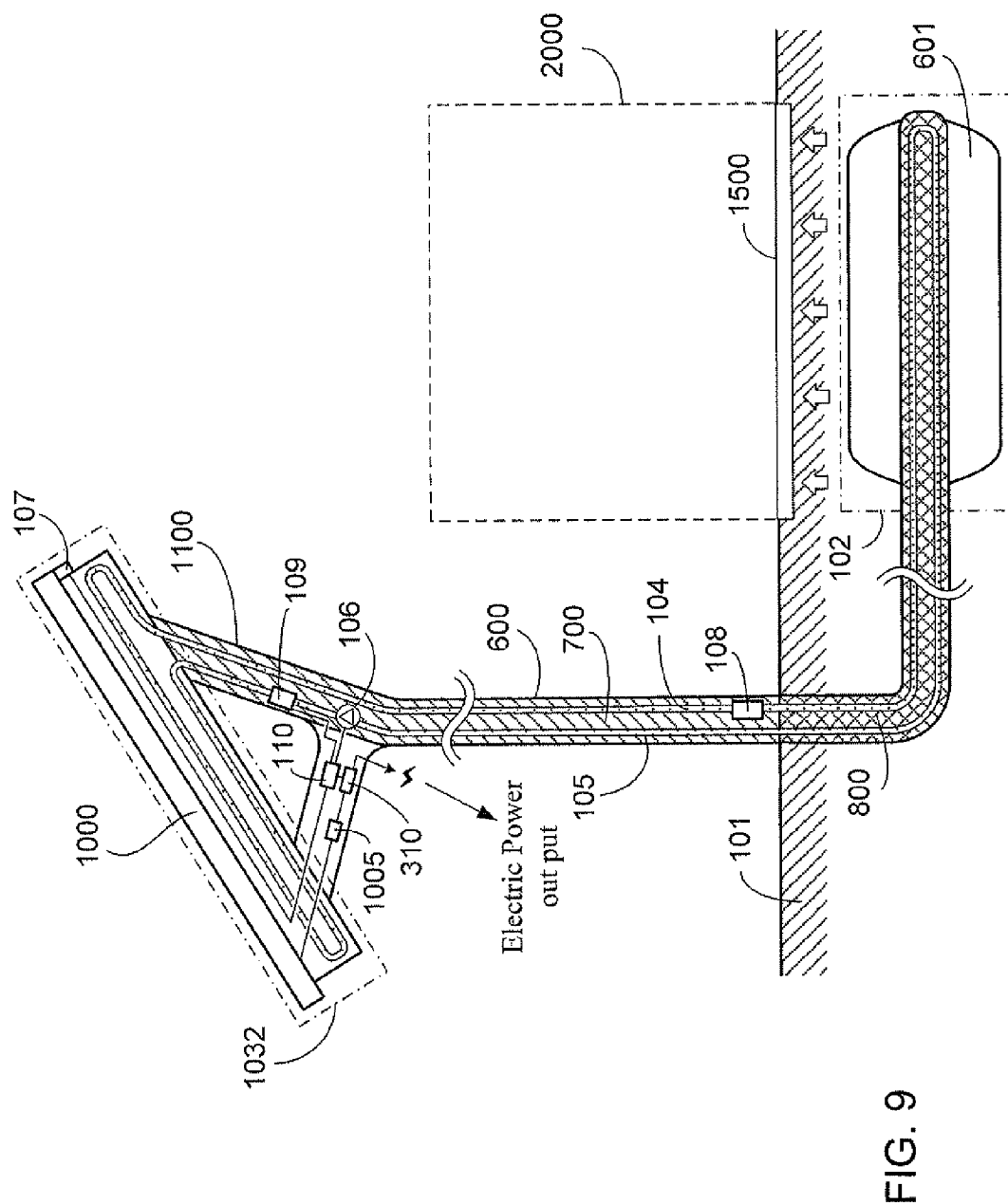
FIG. 9 is a schematic view of the embodiment of the present invention in the application of the photovoltaic generation device capable of transferring light energy into electrical energy.
Figure 10:
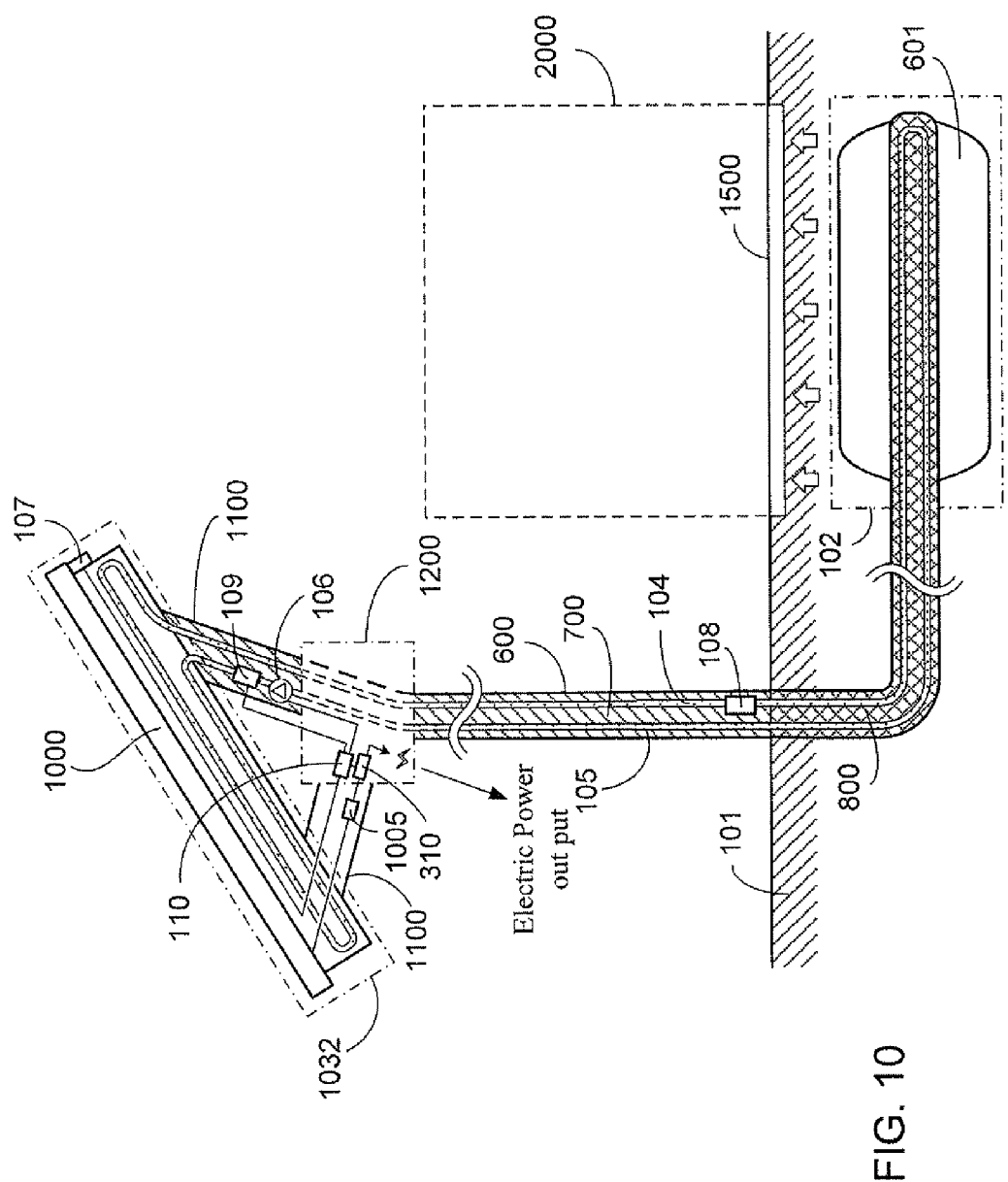
FIG. 10 is a schematic view of another embodiment showing the auxiliary supporting arm of the light source tracking mechanism device is additionally installed to the embodiment of FIG. 9.

FIG. 9 is the schematic of embodiment of present invention in the application of the photovoltaic generation device capable of transferring light energy into electrical energy, which is through the thermal energy of the natural heat carrier (101) consists of solid state natural heat carrier including stratum, surface of earth or desert where presents comparatively larger and more reliable heat carrying capacity to execute temperature equalization to the heat generated by the semiconductor application installation constituted by the photovoltaic generation device with heat dissipation structure at the back (1032) consisted of the photovoltaic generation device of transferring light energy to electrical energy (1000), wherein the main constitution is to be disposed with at least a fluid transmission duct (105) and is through pumping by the pump (106), or through driven by the convection effect caused by rising hot fluid and sinking cold fluid, or through the fluid enabling the fluid to flow through the semiconductor application installation constituted by the photovoltaic generation device with heat dissipation structure at the back (1032), then further through the fluid transmission duct (105) to flow back to the heat equalizer (102) disposed in the natural heat carrier (101), thereby constituting the circulation of fluid; its main structure comprising:

the heat equalizer (102): it relates to one made of a material with good heat conduction performance and constructed in a way to provide good heat conduction with the natural heat carrier (101); the heat equalizer (102) is provided with a fluid inlet, a fluid outlet, and an internal fluid passage; or the space inside the natural heat carrier (101) allowing the fluid to flow forthwith directly constitutes the heat storage function of the heat equalizer (102), thereby replacing the heat equalizer (102) which is made of a material with good heat conduction performance; or both of the heat equalizer (102) and the space inside the natural heat carrier (101) are provided at the same time; the heat equalizer (102) can also consist of the duct of a support (600) that buried into the natural heat carrier (101); the constitution comprises one or more than one heat equalizers (102) performing temperature equalization to the same temperature unifying and heat storing system of semiconductor heat loss through natural temperature maintaining member consisting of the semiconductor application installation constituted by the photovoltaic generation device with heat dissipation structure at the back (1032); or one heat equalizer (102) performing temperature equalization to one or more than one independently disposed temperature unifying and heat storing systems of semiconductor heat loss through natural temperature maintaining member consisting of the semiconductor application installation constituted by the photovoltaic generation device with heat dissipation structure at the back (1032); or two or more than two heat equalizers (102) performing temperature equalization to two or more than two independently disposed temperature unifying and heat storing systems of semiconductor heat loss through natural temperature maintaining members consisting of the semiconductor application installation constituted by the photovoltaic generation device with heat dissipation structure at the back (1032), and through the heat equalizer (102) to transfer thermal energy to the heat storing block (1500) constituted by the surrounding natural heat carrier so as to store heat for releasing thermal energy to the specified heat releasing target (2000);

specified heat releasing target (2000): it relates to the surface of earth of the heat storing block (1500) constituted by the natural heat carrier adjacent to the surrounding of the heat equalizer (102), such as the ground, a road surface or a floor of a building, or a wall recessed into the ground;

driving control circuit (310): it is served to regulate the voltage or electrical current outputted by the photovoltaic generation device (1000);

semiconductor application installation constituted by the photovoltaic generation device with heat dissipation structure at the back (1032): it relates to the glass substrate or the section of semiconductor of photovoltaic, and is disposed with the photovoltaic generation device (1000) capable of transferring light energy into electrical energy, having the heat dissipation structure being equipped with the fluid transmission duct, thereby when receiving the light, the generated electrical energy is transmitted to the electricity regulating device (1005) and then outputted to the outside;

electricity regulating device (1005): it is constituted by the dynamo or the solid state semiconductor circuit component or the integrated circuit for regulating the output voltage and electrical current of photovoltaic generation device (1000);

the fluid (104): it relates to a gas or a liquid provided to execute the function of heat transmission; the fluid is pumped by the pump (106) to flow through the heat equalizer (102) disposed in the natural heat carrier (101) and/or the fluid transmission duct (105) and/or the semiconductor application installation constituted by the photovoltaic generation device with heat dissipation structure at the back (1032), and further flows back through the fluid transmission duct (105) to the heat equalizer (102) to complete the circulation for the operation to provide temperature equalization; or by means of the effects of hot fluid rising and cold fluid sinking to form the circulation for execution of temperature equalization function;

the fluid transmission duct (105): it relates to a duct structure provided at where between the heat equalizer (102) and the semiconductor application installation constituted by the photovoltaic generation device with heat dissipation structure at the back (1032), and is connected in series with the pump (106) for the fluid (104) to circulate; to facilitate maintenance, an optional structure to open or to draw is provided to the fluid transmission duct (105) as applicable;

the pump (106): it relates to a fluid pump driven by the electric power generated by photovoltaic generation device (1000) or electric power of connected electricity storage device or other electric power, or mechanical force, or manpower, or any other natural force, being connected in series with the fluid transmission duct (105), and subject to the control by a control unit (110) to pump the fluid (104); this pumping function can be replaced by the convection effects caused by the rising hot fluid and sinking cold fluid;

a temperature detector device (107): it is related to analog or digital dynamo-electric or solid state electronic device of the prior art, and is disposed in the semiconductor application installation constituted by the photovoltaic generation device with heat dissipation structure at the back (1032) to indicate the temperature, or to provide signal feedback to the control unit (110) and/or the electricity regulating device (1005), and through controlling the pump (106) to operate or stop enabling the system to operate in programmed temperature range, and an auxiliary temperature regulating device (109) is disposed in the system and is activated when the pump (106) operates to reach the programmed time but the temperature yet still unable to operate in the programmed range; this device is optionally installed or not installed as applicable;

a filter (108): it is provided at the fluid suction inlet or outlet of each device mounted to the fluid circulation loop, or at a selected location in the fluid transmission duct (105) to filter fluid foreign material, prevent the duct from getting plugged and assure of clean fluid; the filter (108) is optionally installed or not installed as applicable;

an auxiliary temperature regulation device (109): it is related to dynamo-electric solid, gas or liquid state temperature regulation device to heat or cool the fluid (104), or a electric heating or cooling device comprised of solid state or semiconductor, as subject to the control by the control unit (110) to activate the auxiliary temperature regulating device (109) when the system temperature drifting programmed range, thereby to regulate the temperature by heating or cooling to the heating or cooling location of the fluid (104); this device is optionally installed or not installed as applicable; and the control unit (110): it is comprised of dynamo-electric or solid state electronic circuit and related software, and is served to control the fluid pump (106) to pump the fluid (104) in continuous operation or intermittent operation according to the temperature detection signal and system temperature setting of the temperature detection device (107), and to control the direction and flow rate of the fluid (104) between the heat equalizer (102) and/or the semiconductor application installation constituted by the photovoltaic generation device with heat dissipation structure at the back (1032); and by means of controlling the operation or stop of the pump (106) for the system to operate in the programmed temperature range, and to activate and operatively control the auxiliary temperature regulating device (109) disposed in the system for performing auxiliary temperature regulation when the pump (106) operates to reach the programmed time but the temperature yet still unable to operate in the programmed range; as well as to control system to reduce the load or cut off the power supply when the system temperature is abnormal;

support (600): it relates to one or more than one pillar or frame structure, and the low end is disposed with the heat equalizer (102) disposed in the natural heat carrier (101), wherein the heat equalizer (102) is disposed with thermal conduction wing (601) depending on the need to increase heat conduction effect, and the support (600) is also served to be disposed with the semiconductor application installation constituted by the photovoltaic generation device with heat dissipation structure at the back (1032), as well as the below part or all unit devices including the controlling unit (110), the pump (106), the temperature detector device (107), and filter (108), wherein the semiconductor application installation constituted by the photovoltaic generation device with heat dissipation structure at the back (1032) is optionally disposed at the support (600), or an auxiliary supporting arm (1100) is additionally installed, or as illustrated in FIG. 10 additional auxiliary supporting arm (1100) of light source tracking device (1200) is disposed for tracking the light source, thereby improving the photovoltaic efficiency; above stated semiconductor application installation constituted by the photovoltaic generation device with heat dissipation structure at the back (1032) disposed at the support (600) is provided with the fluid transmission duct, and the fluid inlet and outlet are respectively for connecting to the fluid transmission duct (105) for leading to the heat equalizer (102) to form a closed flow passage; the internal of fluid transmission duct (105) is for flowing the fluid (104); the fluid (104) executes circulation through the convection effect caused by the rising hot fluid and sinking cold fluid, or is pumped by the additionally installed pump (106), thereby for the fluid (104) to execute temperature equalizing transmission between heat equalizer (102) and the semiconductor application installation constituted by the photovoltaic generation device with heat dissipation structure at the back (1032);

heat insulating material (700): it relates to all kinds of heat insulating material for disposing between the support (600) exposed out of the natural heat carrier (101) and the internal of fluid transmission duct (105) to provide heat insulation effect to the outside, so as to reduce thermal energy from escaping; such heat insulating material (700) is optionally disposed according to the need; the insulating material can be replaced by extracting air to achieve vacuum effect, and if the support (600) is made of material with better heat insulating material, or if the fluid transmission duct (105) is made of structure with heat insulating material, the insulating material (700) is optionally not installed;

heat conductor (800): it relates to a material made of heat conducting material for being disposed between the inside of the root duct of the natural heat carrier (101) and the fluid transmission duct (105) to facilitate the temperature equalizing effect of the fluid (104) of fluid transmission duct (105) to the natural temperature carrier (101) through heat equalizer (102); heat conductor can be an integral body with the heat equalizer (102).

Figure 11:
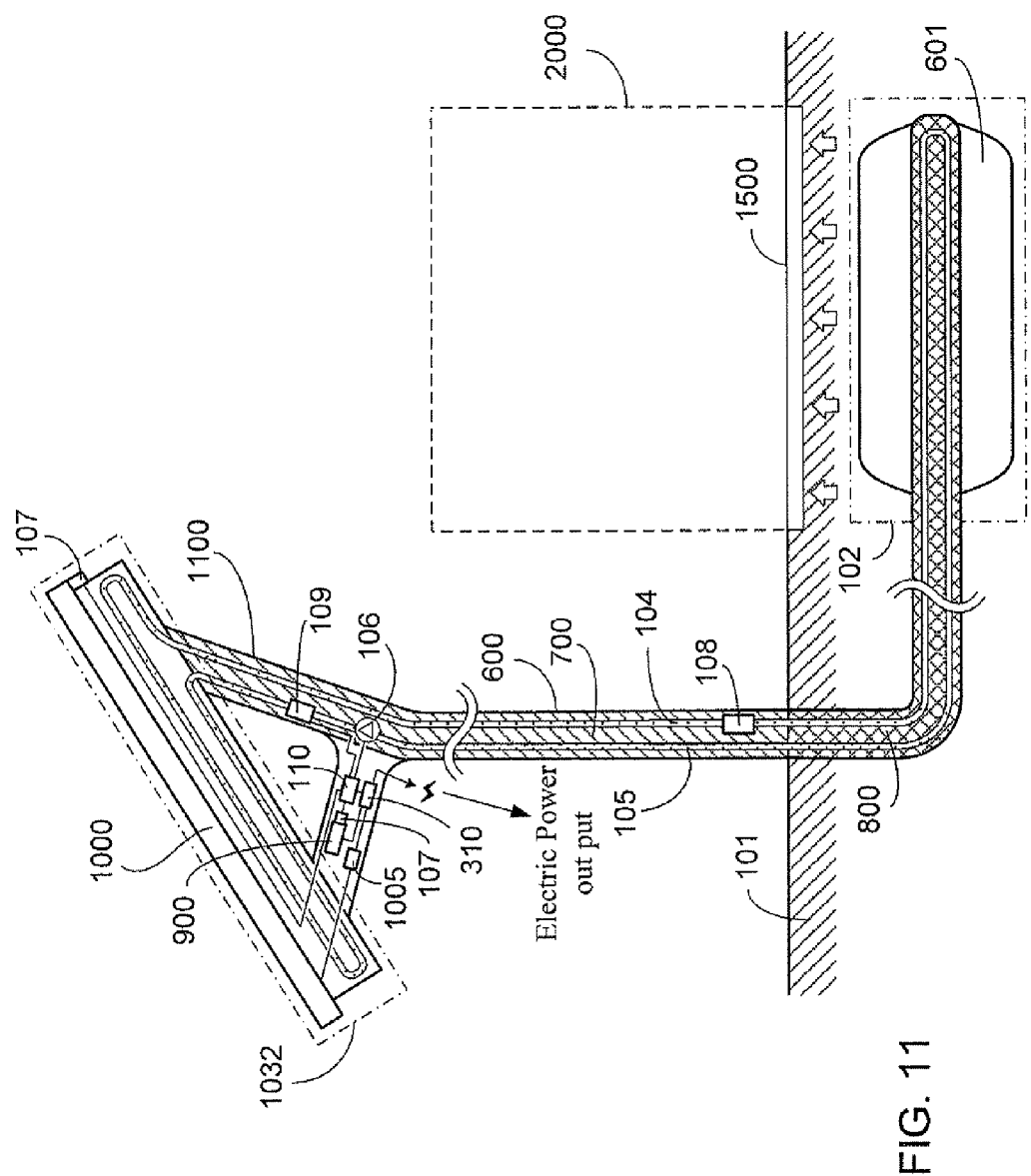
FIG. 11 is a schematic view of embodiment of the present invention in the application of photovoltaic generation device capable of transferring light energy into electrical energy being further disposed with the electricity storage device.
Figure 12:
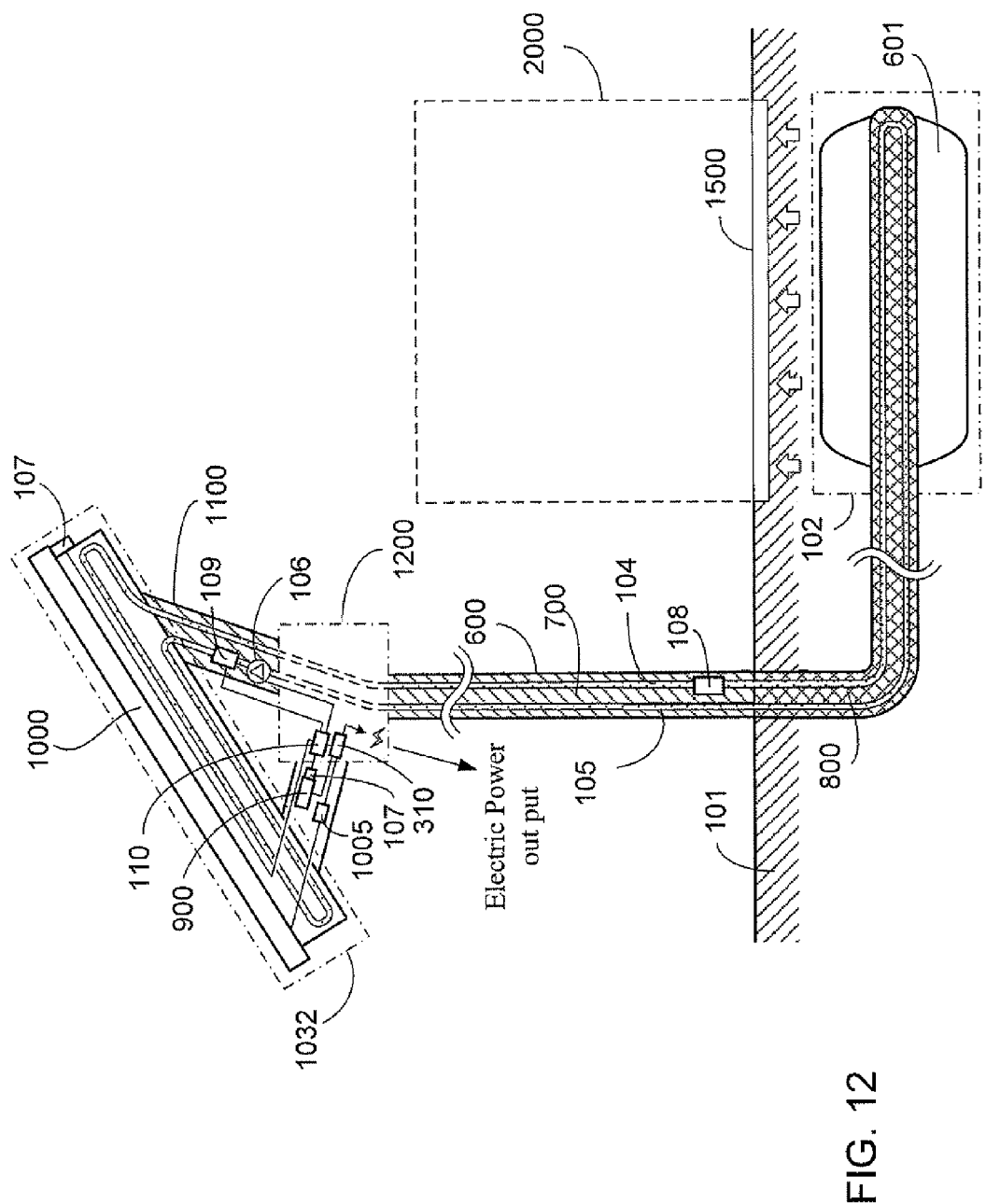
FIG. 12 is a schematic view of another embodiment showing the auxiliary supporting arm of the light source tracking mechanism device is additionally installed to the embodiment of FIG. 11.

FIG. 11 is a schematic view of embodiment of the present invention in the application of photovoltaic generation device capable of transferring light energy into electrical energy being further disposed with the electricity storage device, which is through the thermal energy of the natural heat carrier (101) consists of solid state natural heat carrier including stratum, surface of earth or desert where presents comparatively larger and more reliable heat carrying capacity to execute temperature equalization to the heat generated by the semiconductor application installation constituted by the photovoltaic generation device with heat dissipation structure at the back (1032) consisted of the photovoltaic generation device (1000) and/or the electrical energy storage device (900), wherein the main constitution is to be disposed with at least a fluid transmission duct (105), and is through pumping by the pump (106), or through driven by the convection effect caused by rising hot fluid and sinking cold fluid, or through the fluid enabling the fluid to flow through the semiconductor application installation constituted by the photovoltaic generation device with heat dissipation structure at the back (1032) and/or the electrical energy storage device (900), and further through the fluid transmission duct (105) to flow back to the heat equalizer (102) disposed in the natural heat carrier (101), thereby constituting the circulation of fluid; its main structure comprising:

the heat equalizer (102): it relates to one made of a material with good heat conduction performance and constructed in a way to provide good heat conduction with the natural heat carrier (101); the heat equalizer (102) is provided with a fluid inlet, a fluid outlet, and an internal fluid passage; or the space inside the natural heat carrier (101) allowing the fluid to flow forthwith directly constitutes the heat storage function of the heat equalizer (102), thereby replacing the heat equalizer (102) which is made of a material with good heat conduction performance; or both of the heat equalizer (102) and the space inside the natural heat carrier (101) are provided at the same time; the heat equalizer (102) can also consist of the duct of a support (600) that buried into the natural heat carrier (101); the constitution comprises one or more than one heat equalizers (102) performing temperature equalization to the temperature unifying and heat storing system of semiconductor heat loss through natural temperature maintaining member consisting of the semiconductor application installation constituted by the photovoltaic generation device with heat dissipation structure at the back (1032) and/or the electricity storage device (900); or one heat equalizer (102) performing temperature equalization to one or more than one independently disposed temperature unifying and heat storing system of semiconductor heat loss through natural temperature maintaining member consisting of the semiconductor application installation constituted by the photovoltaic generation device with heat dissipation structure at the back (1032) and/or the electricity storage device (900); or two or more than two heat equalizers (102) performing temperature equalization to two or more than two independently disposed temperature unifying and heat storing systems of semiconductor heat loss through natural temperature maintaining member comprised of the semiconductor application installation constituted by the photovoltaic generation device with heat dissipation structure at the back (1032) and/or the electricity storage device (900), and through the heat equalizer (102) to transfer thermal energy to the heat storing block (1500) constituted by the surrounding natural heat carrier so as to store heat for releasing thermal energy to the specified heat releasing target (2000);

specified heat releasing target (2000): it relates to the surface of earth of the heat storing block (1500) constituted by the natural heat carrier adjacent to the surrounding of the heat equalizer (102), such as the ground, a road surface or a floor of a building, or a wall recessed into the ground;

semiconductor application installation constituted by the photovoltaic generation device with heat dissipation structure at the back (1032): it relates to the glass substrate or the section of semiconductor of photovoltaic, and is disposed with the photovoltaic generation device of transferring light energy to electrical energy (1000) having the heat dissipation structure being equipped with the fluid transmission duct, thereby when receiving the light, the generated electrical energy is transmitted to the electrical energy storage device (900) and then outputted to the outside;

electricity storage device (900): comprising of all kinds of rechargeable secondary battery or capacitor or super capacitor, for storing the electrical power generated by the semiconductor application installation constituted by the photovoltaic generation device with heat dissipation structure at the back (1032) and for output to the external; the electricity storage device (900) is disposed with the temperature detection device (107) and the fluid transmission duct (105) depending on the need;

electricity regulating device (1005): it is constituted by the dynamo or the solid state semiconductor circuit component or the integrated circuit for regulating the output voltage and electrical current of photovoltaic generation device (1000);

the fluid (104): it relates to a gas or a liquid provided to execute the function of heat transmission; the fluid is pumped by the pump (106) to flow through the heat equalizer (102) disposed in the natural heat carrier (101) and/or the fluid transmission duct (105) and/or the semiconductor application installation constituted by the photovoltaic generation device with heat dissipation structure at the back (1032), and further flows back through the fluid transmission duct (105) to the heat equalizer (102) to complete the circulation for the operation to provide temperature equalization; or by means of the effects of hot fluid rising and cold fluid sinking to form the circulation for execution of temperature equalization function;

the fluid transmission duct (105): it relates to a duct structure provided at where between the heat equalizer (102) and the semiconductor application installation constituted by the photovoltaic generation device with heat dissipation structure at the back (1032), and is connected in series with the pump (106) for the fluid (104) to circulate; to facilitate maintenance, an optional structure to open or to draw is provided to the fluid transmission duct (105) as applicable;

the pump (106): it relates to a fluid pump driven by the electric power generated by photovoltaic generation device (1000) or electric power of connected electricity storage device or other electric power, or mechanical force, or manpower, or any other natural force, being connected in series with the fluid transmission duct (105), and subject to the control by a control unit (110) to pump the fluid (104); this pumping function can be replaced by the convection effects caused by the rising hot fluid and sinking cold fluid;

a temperature detector device (107): it is related to analog or digital dynamo-electric or solid state electronic device of the prior art, and is disposed in the semiconductor application installation constituted by the photovoltaic generation device with heat dissipation structure at the back (1032) and/or the electricity storage device (900) to indicate the temperature, or to provide signal feedback to the control unit (110) and/or the electricity regulating device (1005), and through controlling the pump (106) to operate or stop enabling the system to operate in programmed temperature range, and an auxiliary temperature regulating device (109) is disposed in the system and is activated when the pump (106) operates to reach the programmed time but the temperature yet still unable to operate in the programmed range; this device is optionally installed or not installed as applicable;

a filter (108): it is provided at the fluid suction inlet or outlet of each device mounted to the fluid circulation loop, or at a selected location in the fluid transmission duct (105) to filter fluid foreign material, prevent the duct from getting plugged and assure of clean fluid; the filter (108) is optionally installed or not installed as applicable;

an auxiliary temperature regulation device (109): it is related to dynamo-electric solid, gas or liquid state temperature regulation device to heat or cool the fluid (104), or a electric heating or cooling device comprised of solid state or semiconductor, as subject to the control by the control unit (110) to activate the auxiliary temperature regulating device (109) when the system temperature drifting programmed range, thereby to regulate the temperature by heating or cooling to the heating or cooling location of the fluid (104); this device is optionally installed or not installed as applicable; and the control unit (110): it is comprised of dynamo-electric or solid state electronic circuit and related software, and is served to control the fluid pump (106) to pump the fluid (104) in continuous operation or intermittent operation according to the temperature detection signal and system temperature setting of the temperature detection device (107), and to control the direction and flow rate of the fluid (104) between the heat equalizer (102) and/or the semiconductor application installation constituted by the photovoltaic generation device with heat dissipation structure at the back (1032) and/or the electricity storage device (900); and by means of controlling the operation or stop of the pump (106) for the system to operate in the programmed temperature range, and to activate and operatively control the auxiliary temperature regulating device (109) disposed in the system for performing auxiliary temperature regulation when the pump (106) operates to reach the programmed time but the temperature yet still unable to operate in the programmed range; as well as to control system to reduce the load or cut off the power supply when the system temperature is abnormal;

support (600): it relates to one or more than one pillar or frame structure, and the low end is disposed with the heat equalizer (102) disposed in the natural heat carrier (101), wherein the heat equalizer (102) is disposed with thermal conduction wing (601) depending on the need to increase heat conduction effect, and the support (600) is also served to be disposed with the semiconductor application installation constituted by the photovoltaic generation device with heat dissipation structure at the back (1032) and the electricity storage device (900) as well as the below part or all unit devices including the controlling unit (110), the pump (106), the temperature detector device (107), and filter (108), wherein the semiconductor application installation constituted by the photovoltaic generation device with heat dissipation structure at the back (1032) and the electricity storage device (900) is optionally disposed at the support (600), or an auxiliary supporting arm (1100) is additionally installed, or as illustrated in FIG. 12 additional auxiliary supporting arm (1100) of light source tracking device (1200) is disposed for tracking the light source, thereby improving the photovoltaic efficiency; above stated semiconductor application installation constituted by the photovoltaic generation device with heat dissipation structure at the back (1032) and/or the electricity storage device (900) disposed at the support (600) is provided with the fluid transmission duct, and the fluid inlet and outlet are respectively for connecting to the fluid transmission duct (105) for leading to the heat equalizer (102) to form a closed flow passage; the internal of fluid transmission duct (105) is for flowing the fluid (104); the fluid (104) executes circulation through the convection effect caused by the rising hot fluid and sinking cold fluid, or is pumped by the additionally installed pump (106), thereby for the fluid (104) to execute temperature equalizing transmission between heat equalizer (102) and the semiconductor application installation constituted by the photovoltaic generation device with heat dissipation structure at the back (1032) and/or the electricity storage device (900);

heat insulating material (700): it relates to all kinds of heat insulating material for disposing between the support (600) exposed out of the natural heat carrier (101) and the internal of fluid transmission duct (105) to provide heat insulation effect to the outside, so as to reduce thermal energy from escaping; such heat insulating material (700) is optionally disposed according to the need; the insulating material can be replaced by extracting air to achieve vacuum effect, and if the support (600) is made of material with better heat insulating material, or if the fluid transmission duct (105) is made of structure with heat insulating material, the insulating material (700) is optionally not installed;

heat conductor (800): it relates to a material made of heat conducting material for being disposed between the inside of the root duct of the natural heat carrier (101) and the fluid transmission duct (105) to facilitate the temperature equalizing effect of the fluid (104) of fluid transmission duct (105) to the natural temperature carrier (101) through heat equalizer (102); heat conductor can be an integral body with the heat equalizer (102).

The temperature unifying and heat storing system of semiconductor heat loss through natural temperature maintaining member, its support (600) can have one or more than one U-shape tube to constitute the pillar of the support, the top of the U-shape duct is for connecting to the rack structure disposed at the top as illustrated in FIGS. 5, 6, 7, 8, 9, 10, 11, and 12 for disposing related semiconductor application installation and related control circuit device, and the fluid duct at the top of U-shape duct is for connecting to the fluid transmission duct (105) disposed on the semiconductor application installation or the optionally installed electrical energy storage device (900) in order to form a closed fluid path for passing the fluid to transmit thermal energy with the heat equalizer (102), and through the heat equalizer (102) to transfer thermal energy to the heat storing block (1500) constituted by the surrounding natural heat carrier so as to store heat for releasing thermal energy to the specified heat releasing target (2000), and can further optionally dispose the pump filter device, and the light source tracking mechanism (1200), etc. according to the function of the disposed semiconductor application installation.

Figure 13:
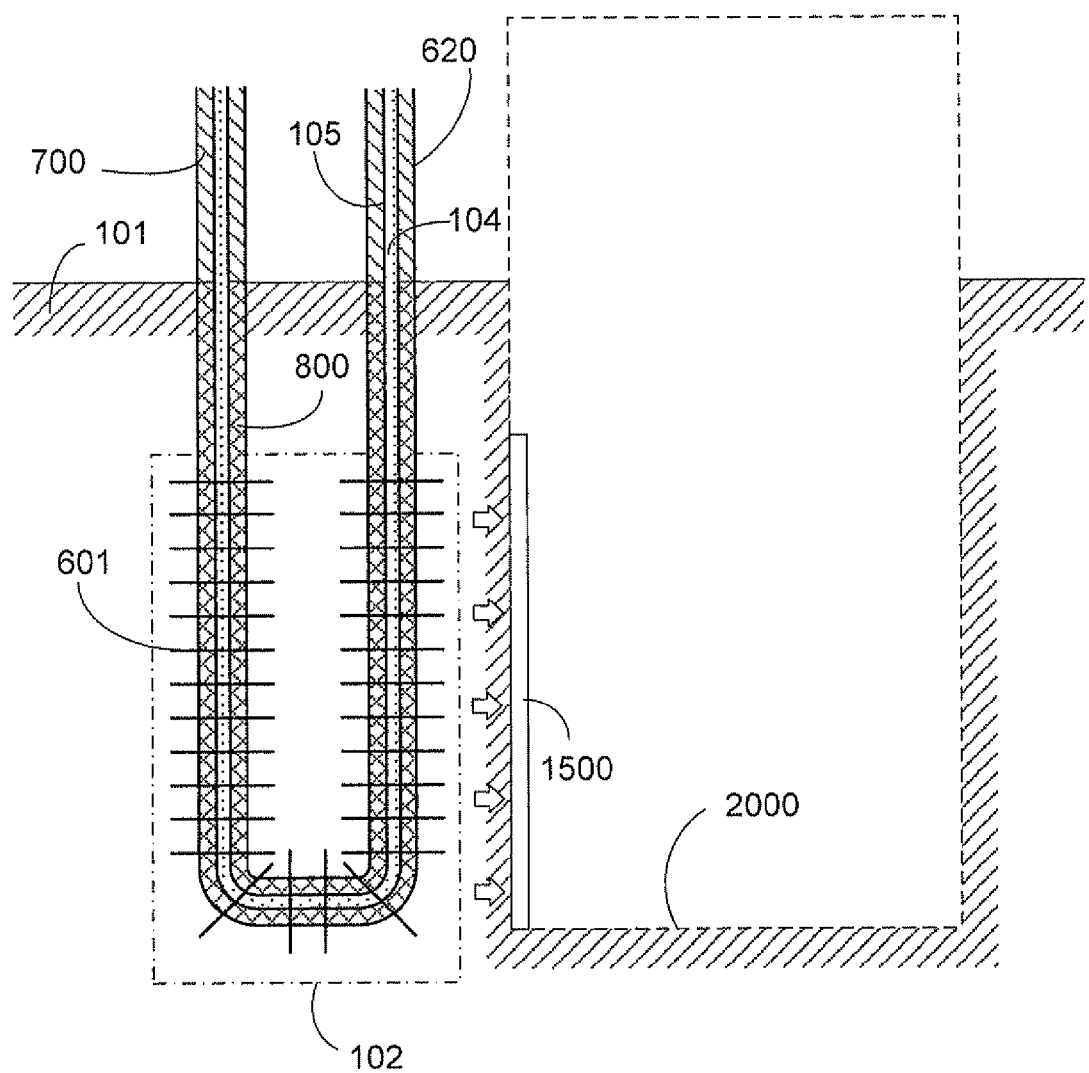
FIG. 13 is a schematic view of the embodiment of the present invention showing a U-shape duct consisted of a supporting pillar disposed with the internal fluid duct and the heat equalizer (102).
Figure 14:
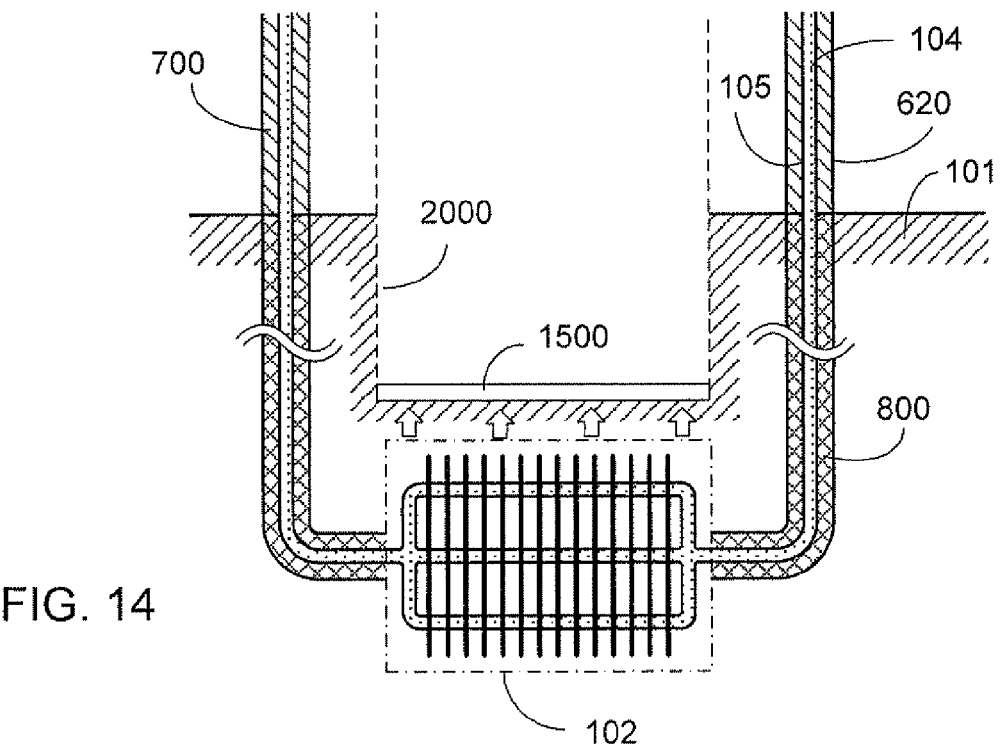
FIG. 14 is a schematic view of the embodiment of the present invention consists of a U-shape duct disposed with another heat equalizer (102) disposed in the natural heat carrier (101) for connecting to the fluid transmission duct (105) inside the U-shape duct.
Figure 15:
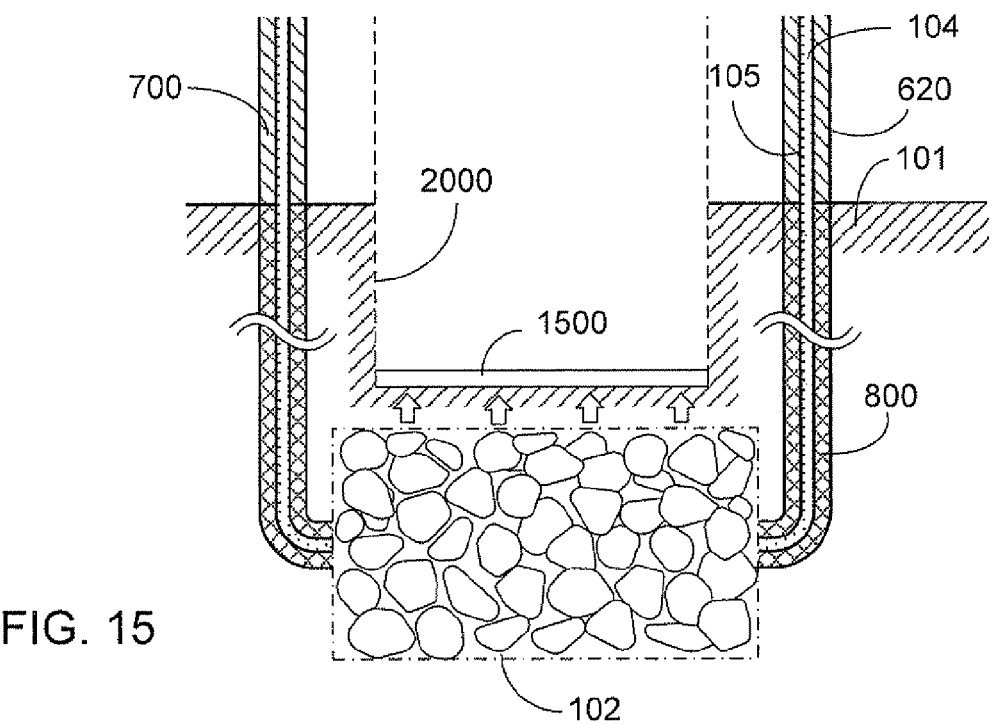
FIG. 15 is a schematic view of the embodiment of the present invention showing a U-shape duct consists of a supporting pillar disposed with internal fluid duct and the space of the internal of natural heat carrier (101) for fluid to flow.

The U-shape duct is constituted by the heat insulation material, or is constituted by wrapping with the heat insulation material, or is enclosed by a tubing as the heat insulation layer, or the outer duct (620) with larger diameter forming the support (600) structure, the internal is penetrated with the internal fluid transmission duct (105) of smaller diameter for fluid to pass through, wherein for the part of the U-shape duct exposed above the natural heat carrier (101), the exterior of its outer duct (620) is for wrapping with heat insulation material, the space between the inner wall of the outer duct (620) and of the internal fluid transmission duct (105) is for filling of the heat insulation material (700), the top of U-shape duct is for connecting to the support structure disposed at the top as illustrated in FIGS. 5, 6, 7, 8, 9, 10, 11, and 12; the U-shape duct itself is the structure for fluid duct function, and its method of construction includes one or more than one kind as follows, comprising:

1) the duct disposed in the natural heat carrier (101) is constituted by the material with good thermal conduction property, thereby having good thermal conduction structure with the natural heat carrier (101) to form the heat equalization function, and a heat conductor (800) is disposed between the part the outer duct (620) disposed in natural heat carrier (101) and the internal fluid transmission duct; (as the embodiment illustrated in FIG. 13 showing the U-shape duct consisted of a supporting pillar disposed with the internal fluid duct and the heat equalizer (102); or 2) a heat equalizer (102) is additionally disposed in the natural heat carrier (101), wherein the heat equalizer (102) is disposed with fluid inlet and fluid outlet, connecting respectively to the fluid transmission duct (105) disposed inside the U-shape duct to form the fluid circulation path, the inside of the heat equalizer (102) is disposed with the fluid duct, and the heat equalizer (102) is optionally disposed with the thermal conduction wing (601) for increasing heat equalization effect; (as the embodiment illustrated in FIG. 14 showing the U-shape duct disposed with another heat equalizer (102) disposed in the natural heat carrier (101) for connecting to the fluid transmission duct (105) inside the U-shape duct); or 3) by means of the outer duct to directly connect to the space inside the natural heat carrier (101) for passing through the fluid, so as to constitute the thermal storage function of the heat equalizer (102) directly by the space of natural heat carrier, thereby replacing the heat equalizer (102) made of good heat conduction material; (as the embodiment illustrated in FIG. 15 showing a U-shape duct consists of a supporting pillar disposed with internal fluid duct and the space of the internal of the natural heat carrier (101) for fluid to flow).

The internal of above stated U-shape duct is disposed with the fluid transmission duct (105) passing through the heat equalizer (102) disposed in the natural heat carrier (101), the top is disposed with the fluid inlet and the fluid outlet for connecting to the fluid transmission duct (105) disposed to the gas state or liquid state semiconductor application installation or optionally installed electrical energy storage device (900) through the fluid transmission duct (105) externally installed, and by means of the natural convection of rising hot fluid and sinking cold fluid or being disposed with the pump (106) to pump the fluid performing heat circulation.

As is summarized from above descriptions, the temperature unifying and heat storing system of semiconductor heat loss through natural temperature maintaining member of the present invention, it uses the long-term stable thermal energy from the natural heat carrier, and takes the fluid (104) flowing through the heat equalizer (102) mounted in the natural heat carrier as the thermal energy carrier to achieve the purpose of heat equalization as the fluid (104) flows through the semiconductor application installation constituted by the LED or gas state lamp with heat dissipation structure at the back (1031), and/or the semiconductor application installation constituted by the photovoltaic generation device with heat dissipation structure at the back (1032), and/or the electricity storage device (900), and through the heat equalizer (102) to transfer thermal energy to a heat storing block (1500) constituted by the surrounding natural heat carrier so as to store heat for releasing thermal energy to a specified heat releasing target (2000).

The invention claimed is:

1. A temperature unifying and heat storing system for transferring heat from a semiconductor application installation (103) and storing the heat in a heat storing block (1500) surrounded by a natural heat carrier (101) for release to a predetermined heat release target (2000), comprising:

at least one heat equalizer (102) surrounded by the natural heat carrier (101) for receiving heat generated by at least one semiconductor device in the semiconductor device installation (103) via a fluid passage through the heat equalizer (102) and transferring the heat to the heat storing block (1500) in the surrounding natural heat carrier (101), the heat storing block (1500) storing the heat for release to the predetermined heat release target (2000);

the semiconductor application installation (103) including the at least one semiconductor device, a semiconductor device temperature equalization structure for dissipating heat generated by the at least one semiconductor device, and a semiconductor device duct through which a fluid (104) passes to receive the heat from the semiconductor device temperature equalization structure;

a fluid transmission duct (105) connected to the semiconductor device duct to enable the fluid (104) to circulate into and out of the semiconductor application installation (103) in response to one of (i) natural convection and (ii) a pump (106) for pumping the fluid (104) through the fluid transmission duct (105) and the semiconductor application installation (103); and a control unit (110) for controlling circulation of the fluid (104) through the semiconductor application installation (103).

2. A temperature unifying and heat storing system as claimed in claim 1, wherein said fluid (104) circulates between the semiconductor application installation (103) and the at least one heat equalizer (102) by fluid convection caused rising hot fluid and sinking cold fluid.

3. A temperature unifying and heat storing system as claimed in claim 1, in which circulation of fluid through the semiconductor application installation (103) is caused by said pump (106), and said control unit (110) controls said pump (106) to control a flow rate and direction of said fluid (104).

4. A temperature unifying and heat storing system as claimed in claim 1, wherein the heat equalizer (102) includes a fluid inlet, a fluid outlet, and a fluid passage through the heat equalizer, said fluid inlet and fluid outlet being connected to the fluid transmission duct (105).

5. A temperature unifying and heat storing system as claimed in claim 1, wherein the heat equalizer (102) includes a space for allowing fluid to pass directly through the heat equalizer.

6. A temperature unifying and heat storing system as claimed in claim 1, wherein the predetermine heat release target (2000) is a surface of the earth, a road surface, a floor of a building, or a wall recessed into the surface of the earth.

7. A temperature unifying and heat storing system as claimed in claim 1, wherein the at least one semiconductor device includes at least one of an LED; electricity-to-light converter with a gas state semiconductor; photovoltaic generation device; power transistor; rectifying diode; thyristor; MOSFET; IGBT; GTO; SCR; TRIAC; linear transistor; integrated circuit; RAM; CPU; server; lighting device with an LED; host computer; power supply device; electromechanically driven control device; converter; inverter; charger; electrical heat controlling device; electromagnetic controller; electric lighting control device.

8. A temperature unifying and heat storing system as claimed in claim 1, further comprising a temperature detector device (107) disposed in the semiconductor application installation (103) for supplying temperature feedback to said control unit (110), and wherein said control unit (110) controls said pump (106) in response to said temperature feedback from said temperature detector device (107) to cause a temperature of said semiconductor application installation to be within a predetermined temperature range.

9. A temperature unifying and heat storing system as claimed in claim 8, further comprising an auxiliary temperature regulating device (109) for providing auxiliary heating or cooling to maintain said predetermined temperature range in response to said temperature feedback from said temperature detector device (107).

10. A temperature unifying and heat storing system as claimed in claim 1, further comprising at least one filter (108) installed within a circulation path of said fluid (104).

11. A temperature unifying and heat storing system as claimed in claim 1, further comprising a fluid bypass duct (119), bypass control valve (120), and bypass auxiliary pump (121) disposed in the semiconductor application installation (103), said bypass control valve (120) and bypass auxiliary pump (121) being connected to said control unit (110) to control passage of said fluid (104) through said fluid bypass duct (119) and therefore a flow rate of said fluid (104) through said semiconductor application installation.

12. A temperature unifying and heat storing system as claimed in claim 1, further comprising a relay heat equalizer (202) installed between the at least one heat equalizer (102) and the semiconductor application installation (103), said relay heat equalizer (202) including a first fluid passage including a first inlet, a first flow passage, and a first outlet for said fluid (104) and a second fluid passage including a second inlet, a second flow passage, and a second outlet for a second fluid (204), said first fluid (104) circulating through said semiconductor application installation (103) and said second fluid (204) circulating through said at least one heat equalizer (102), wherein said relay heat equalizer (202) transfers heat between said first fluid (104) and second fluid (204).

13. A temperature unifying and heat storing system as claimed in claim 12, further comprising a second fluid transmission duct (205) connecting said second fluid inlet and second fluid outlet of said relay heat equalizer (202) with said at least one heat equalizer (102), and a fluid relay pump (206) for pumping said second fluid (204) through said second fluid transmission duct (205), said relay heat equalizer (202), and said at least one heat equalizer (102), and wherein said fluid relay pump (206) is connected to and controlled by said control unit (110) to control at least one of a direction and flow rate of the second fluid (204).

14. A temperature unifying and heat storing system as claimed in claim 12, further comprising a second fluid transmission duct (205) connecting said second fluid inlet and second fluid outlet of said relay heat equalizer (202) with said at least one heat equalizer (102), wherein said second fluid (204) circulates through said second fluid transmission duct (205) by convection rather than by an electric or mechanical pump.

15. A temperature unifying and heat storing system as claimed in claim 12, wherein a flow direction of at least one of said first fluid (104) and said second fluid (204) is periodically reversed.

16. A temperature unifying and heat storing system as claimed in claim 1, wherein a flow direction of said fluid (104) is periodically reversed.

17. A temperature unifying and heat storing system as claimed in claim 1, wherein the semiconductor installation application is an LED or gas state lamp with a heat dissipation structure (1031) through which said fluid transmission duct (105) passes, said fluid (104) transferring heat from said LED or gas state lamp to said heat equalizer (102) for storage in said at least one heat storage block (1500) and release to said heat release target (2000).

18. A temperature unifying and heat storing system as claimed in claim 17, further comprising a temperature detection device (107) and a second control circuit (310) for controlling a power supply to said LED or gas state lamp, said control of the power supply including cut-off of said power supply when a temperature detected by the temperature detection device (107) is abnormal, and said power supply including at least one of an electrical energy storage device (900) and an electrical connection to an external power source.

19. A temperature unifying and heat storing system as claimed in claim 17, wherein said fluid transmission duct (105) passes through a support (600) for the LED or gas state lamp, said support (600) being surrounded by a heat insulating material (700), and wherein a heat conductor (800) is disposed between the natural heat carrier (101) and fluid transmission duct (105).

20. A temperature unifying and heat storing system as claimed in claim 17, further comprising a photovoltaic generation device (1000) for converting light energy into electrical energy and supplying the electrical energy to the semiconductor application installation, said photovoltaic generation device (1000) including a second heat dissipation structure through which said fluid transmission duct (105) passes.

21. A temperature unifying and heat storing system as claimed in claim 1, wherein the semiconductor application installation is a photovoltaic generation device (1000) for converting light energy into electrical energy and supplying the electrical energy to the semiconductor application installation, said photovoltaic generation device (1000) including a second heat dissipation structure through which said fluid transmission duct (105) passes.

22. A temperature unifying and heat storing system as claimed in claim 21, wherein the photovoltaic generation device (1000) is supported by at least one auxiliary supporting arm (1100) and a light source tracking device (1200) that moves the photovoltaic generation device (1000) to track passage of the sun.

23. A temperature unifying and heat storing system as claimed in claim 1, comprising:
- at least one support (600) for the semiconductor application installation (103), the support including at least one U-shaped duct for forming a closed fluid path that transfers heat from the semiconductor device installation application (103) to the heat storing block (1500) via the heat equalizer (102),
- wherein the at least one U-shaped duct includes at least one of: (i) said fluid transmission duct (105), (ii) a U-shaped duct connected to said fluid transmission duct (105), and (iii) a larger diameter duct (620) through which said fluid transmission duct (105) passes and that forms said support (600),
- wherein a second of the at least one U-shaped duct that is above said heat equalizer (102) is insulated by at least one of: (i) an insulating material of the U-shaped duct, (ii) a heat insulation material wrapped around the U-shaped duct, (iii) said larger diameter duct (620), and (iv) an insulation material (700) situated between said larger diameter duct (620) and said fluid transmission duct (105), and
- wherein heat transfer from the U-shaped duct to the heat storing block (1500) is facilitated by at least one of: (i) the U-shaped duct in a vicinity of the heat storing block (1500) being made of a thermally conductive material that serves as said heat equalizer (102), (ii) the U-shaped duct includes a passage through the heat equalizer (102), the heat equalizer (102) including a fluid inlet and a fluid outlet, (iii) the U-shaped duct includes a passage through the heat equalizer (102), and the heat equalizer (102) further includes thermal conduction fin structures extending into the natural heat carrier (101), and (iv) the U-shaped duct connects with a space inside the natural heat carrier (101), the space in the natural heat carrier (101) serving as the heat equalizer (102).

\* \* \* \* \*